United States Patent
Takada et al.

(10) Patent No.: US 12,160,596 B2
(45) Date of Patent: Dec. 3, 2024

(54) IMAGE DECODING APPARATUS, IMAGE ENCODING APPARATUS, AND IMAGE DECODING METHOD

(71) Applicant: SHARP KABUSHIKI KAISHA, Sakai (JP)

(72) Inventors: Keiichiro Takada, Sakai (JP); Yukinobu Yasugi, Sakai (JP); Tomohiro Ikai, Sakai (JP); Takeshi Chujoh, Sakai (JP); Tomoko Aono, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 94 days.

(21) Appl. No.: 18/089,312

(22) Filed: Dec. 27, 2022

(65) Prior Publication Data

US 2023/0209074 A1    Jun. 29, 2023

(30) Foreign Application Priority Data

Dec. 27, 2021  (JP) ................................. 2021-212037

(51) Int. Cl.
| | |
|---|---|
| H04N 19/42 | (2014.01) |
| H04N 19/132 | (2014.01) |
| H04N 19/184 | (2014.01) |
| H04N 19/186 | (2014.01) |
| H04N 19/70 | (2014.01) |
| H04N 19/82 | (2014.01) |

(52) U.S. Cl.
CPC ............ *H04N 19/42* (2014.11); *H04N 19/132* (2014.11); *H04N 19/184* (2014.11); *H04N 19/186* (2014.11); *H04N 19/70* (2014.11); *H04N 19/82* (2014.11)

(58) Field of Classification Search
CPC ...... H04N 19/82; H04N 19/70; H04N 19/186; H04N 19/184; H04N 19/132; H04N 19/42
See application file for complete search history.

(56) References Cited

U.S. PATENT DOCUMENTS

| | | | |
|---|---|---|---|
| 2020/0184200 A1* | 6/2020 | Wang | G06V 40/1365 |
| 2021/0158132 A1* | 5/2021 | Huynh | G06N 3/045 |

OTHER PUBLICATIONS

Tencent, "AHG9/AHG11: SEI messages for carriage of neural network information for postfiltering", Document: JVET-V0091, Joint Video Experts Team (JVET) of ITU-T SG 16 WP 3 and ISO/IEC JTC 1/SC 29, 22nd Meeting, by teleconference, Apr. 20-28, 2021.
Nokia, "AHG9: On post-filter SEI", Document: JVET-X0112-v1, Joint Video Experts Team (JVET) of ITU-T SG 16 WP 3 and ISO/IEC JTC 1/SC 29, 24th Meeting, by teleconference, Oct. 6-15, 2021.

* cited by examiner

*Primary Examiner* — On S Mung
(74) *Attorney, Agent, or Firm* — ScienBiziP, P.C.

(57) ABSTRACT

According to an aspect of the present disclosure, an image decoding apparatus for decoding information specifying a neural network includes: header decoding circuitry that decodes an input tensor identification parameter specifying a process for deriving an input tensor input for a post filter of the neural network. The input tensor identification parameter is a parameter related to a color component channel.

12 Claims, 18 Drawing Sheets

| nnr_post_filter( payloadSize ) { | Descriptor |
|---|---|
|   nnrpf_id | u(21) |
|   nnrpf_mode_idc | u(2) |
|   if( nnrpf_mode_idc > 0 ){ | |
|     nnrpf_persistence_flag | u(1) |
|     nnrpf_parameter_type_idc | u(4) |
|     nnrpf_num_parameters_idc | ue(v) |
|     nnrpf_operation_type_idc | u(4) |
|     nnrpf_num_kmac_operations_idc | ue(v) |
|     while( !byte_aligned( ) ) | |
|       nnrpf_alignment_zero_bit /* equal to 0 */ | f(1) |
|   } | |
|   if( nnrpf_mode_idc == 1 ) { | |
|     i = 0 | |
|     do { | |
|       nnrpf_uri[ i ] | b(8) |
|     while( nnrpf_uri[ i++ ] != 0 ) | |
|   } | |
|   if( nnrpf_mode_idc == 2 || nnrpf_mode_idc == 3 ) { | |
|     for( i = 0; i < payloadSize - 3 ; i++ ) | |
|       nnrpf_payload_byte[ i ] | b(8) |
|   } | |
| } | |

FIG. 7

| nnr_post_filter( payloadSize ) { | Descriptor |
|---|---|
|   nnrpf_id | u(21) |
|   nnrpf_mode_idc | u(2) |
|   if( nnrpf_mode_idc > 0 ){ | |
|     nnrpf_persistence_flag | u(1) |
|     nnrpf_parameter_type_idc | u(2) |
|     nnrpf_parameter_bit_width_idc | u(2) |
|     nnrpf_num_parameters_idc | ue(v) |
|     nnrpf_operation_type_idc | u(4) |
|     nnrpf_num_kmac_operations_idc | ue(v) |
|     while( !byte_aligned( ) ) | |
|       nnrpf_alignment_zero_bit /* equal to 0 */ | f(1) |
|   } | |
|   if( nnrpf_mode_idc == 1 ) { | |
|     i = 0 | |
|     do { | |
|       nnrpf_uri[ i ] | b(8) |
|     while( nnrpf_uri[ i++ ] != 0 ) | |
|   } | |
|   if( nnrpf_mode_idc == 2 || nnrpf_mode_idc == 3 ) { | |
|     for( i = 0; i < payloadSize - 3 ; i++ ) | |
|       nnrpf_payload_byte[ i ] | b(8) |
|   } | |
| } | |

FIG. 8

| nnr_post_filter( payloadSize ) { | Descriptor |
|---|---|
|   nnrpf_id | u(21) |
|   nnrpf_mode_idc | u(2) |
|   if( nnrpf_mode_idc > 0 ){ | |
|     nnrpf_persistence_flag | u(1) |
|     nnrpf_parameter_type_idc | u(2) |
|     nnrpf_log2_parameter_bit_width_minus_3 | u(2) |
|     nnrpf_num_parameters_idc | ue(v) |
|     nnrpf_operation_type_idc | u(4) |
|     nnrpf_num_kmac_operations_idc | ue(v) |
|     while( !byte_aligned( ) ) | |
|       nnrpf_alignment_zero_bit /* equal to 0 */ | f(1) |
|   } | |
|   if( nnrpf_mode_idc == 1 ) { | |
|     i = 0 | |
|     do { | |
|       nnrpf_uri[ i ] | b(8) |
|     while( nnrpf_uri[ i++ ] != 0 ) | |
|   } | |
|   if( nnrpf_mode_idc == 2 \|\| nnrpf_mode_idc == 3 ) { | |
|     for( i = 0; i < payloadSize - 3 ; i++ ) | |
|       nnrpf_payload_byte[ i ] | b(8) |
|   } | |
| } | |

FIG. 9

| post_filter_purpose( payloadSize ) { | Descriptor |
|---|---|
|    pfp_id | u(21) |
|    pfp_purpose | ue(v) |
|    if( pfp_purpose == 1 ) { /* super resolution */ | |
|       pfp_pic_width_in_luma_samples | ue(v) |
|       pfp_pic_height_in_luma_samples | ue(v) |
|    } else if (pfp_purpose == 2 ) { /* conversion of chroma format */ | |
|       pfp_component_id | u(2) |
|       pfp_output_diff_chroma_format_idc | u(2) |
|    } | |
| } | |

FIG. 11

| nnr_post_filter( payloadSize ) { | Descriptor |
|---|---|
|   nnrpf_id | u(21) |
|   nnrpf_mode_idc | u(2) |
|   if( nnrpf_mode_idc > 0 ) | |
|     nnrpf_persistence_flag | u(1) |
|     nnrpf_input_format_idc | u(4) |
|     nnrpf_output_format_idc | u(4) |
|   if( nnrpf_mode_idc == 1 ) { | |
|     i = 0 | |
|     do { | |
|       nnrpf_uri[ i ] | b(8) |
|     while( nnrpf_uri[ i++ ] != 0 ) | |
|   } | |
|   if( nnrpf_mode_idc == 2 \|\| nnrpf_mode_idc == 3 ) { | |
|     for( i = 0; i < payloadSize - 3 ; i++ ) | |
|       nnrpf_payload_byte[ i ] | b(8) |
|   } | |
| } | |

FIG. 14

| nnrpf_input_format_idc | Number of channels | Data format |
|---|---|---|
| 0 | 1 | 3D tensor (C, H, W) |
| 1 | 2 | 3D tensor (C, H, W) |
| 2 | 3 | 3D tensor (C, H, W) |
| 3 | 6 | 3D tensor (C, H, W) |
| 4..7 | - | Reserved |

FIG. 15

| nnrpf_output_format_idc | Number of channels | Data format |
| --- | --- | --- |
| 0 | 1 | 3D tensor (C, H, W) |
| 1 | 2 | 3D tensor (C, H, W) |
| 2 | 3 | 3D tensor (C, H, W) |
| 3 | 6 | 3D tensor (C, H, W) |
| 4..7 | - | Reserved |

FIG. 16

| nnrpf_input_format_idc | Conversion process |
|---|---|
| 0 | inputTensor[0][y][x] = ComponentSample[ 0 ][x][y] |
| 1 | inputTensor[0][cy][cx] = ComponentSample[ 1 ][cx][cy] |
| | inputTensor[1][cy][cx] = ComponentSample[ 2 ][cx][cy] |
| 2 | SW=SubWidthC |
| | SH=SubHeightC |
| | inputTensor[ 0 ][y][x] = ComponentSample[ 0 ][x][y] |
| | inputTensor[ 1 ][y][x] = ComponentSample[ 1 ][x/SW][y/SH] |
| | inputTensor[ 2 ][y][x] = ComponentSample[ 2 ][x/SW][y/SH] |
| 3 | inputTensor[ 0 ][cy][cx] = ComponentSample[ 0 ][cx*2][cy*2] |
| | inputTensor[ 1 ][cy][cx] = ComponentSample[ 0 ][cx*2+1][cy*2] |
| | inputTensor[ 2 ][cy][cx] = ComponentSample[ 0 ][cx*2][cy*2+1] |
| | inputTensor[ 3 ][cy][cx] = ComponentSample[ 0 ][cx*2+1][cy*2+1] |
| | inputTensor[ 4 ][cy][cx] = ComponentSample[ 1 ][cx][cy] |
| | inputTensor[ 5 ][cy][cx] = ComponentSample[ 2 ][cx][cy] |
| 4..15 | Reserved |

FIG. 17

| nnrpf_output_format_idc | Conversion |
|---|---|
| 0 | outSamplesL[x][y] = outputTensor[ 0 ][y][x] |
| 1 | outSamplesCb[cx][cy] = outputTensor[ 0 ][cy][cx] |
| | outSamplesCr[cx][cy] = outputTensor[ 1 ][cy][cx] |
| 2 | outSamplesL[x][y] = outputTensor[ 0 ][y][x] |
| | outSamplesCb[cx][cy] = outputTensor[ 1 ][cy*outSH][cx*outSW] |
| | outSamplesCr[cx][cy] = outputTensor[ 2 ][cy*outSH][cx*outSW] |
| 3 | outSamplesL[x/2*2][y/2*2] = outputTensor[ 0 ][y/2][x/2] |
| | outSamplesL[x/2*2+1][y/2*2] = outputTensor[ 1 ][y/2][x/2] |
| | outSamplesL[x/2*2][y/2*2+1] = outputTensor[ 2 ][y/2][x/2] |
| | outSamplesL[x/2*2+1][y/2*2+1]= outputTensor[ 3 ][y/2][x/2] |
| | outSamplesCb[cx][cy] = outputTensor[ 4 ][cy*outSH][cx*outSW] |
| | outSamplesCr[cx][cy] = outputTensor[ 5 ][cy*outSH][cx*outSW] |

FIG. 18

IMAGE DECODING APPARATUS, IMAGE ENCODING APPARATUS, AND IMAGE DECODING METHOD

CROSS-REFERENCE TO RELATED APPLICATIONS

This application claims the benefit of priority to Japanese Patent Application Number 2021-212037 filed on Dec. 27, 2021. The entire contents of the above-identified application are hereby incorporated by reference.

BACKGROUND

Embodiments of the present disclosure relate to a video coding apparatus and a video decoding apparatus.

TECHNICAL FIELD

A video coding apparatus which generates coded data by coding a video, and a video decoding apparatus which generates decoded images by decoding the coded data are used for efficient transmission or recording of videos.

Specific video coding schemes include, for example, H.264/AVC and an H.265/High-Efficiency Video Coding (HEVC) scheme.

In such a video coding scheme, images (pictures) constituting a video are managed in a hierarchical structure including slices obtained by splitting an image, coding tree units (CTUs) obtained by splitting a slice, units of coding (which may also be referred to as coding units (CUs)) obtained by splitting a coding tree unit, and transform units (TUs) obtained by splitting a coding unit, and are coded/decoded for each CU.

In such a video coding scheme, usually, a prediction image is generated based on a local decoded image that is obtained by coding/decoding an input image (a source image), and prediction errors (which may be referred to also as "difference images" or "residual images") obtained by subtracting the prediction image from the input image are coded. Generation methods of prediction images include an inter-picture prediction (inter prediction) and an intra-picture prediction (intra prediction).

H.274 defines supplemental enhancement information SEI for transmitting the properties of images, a display method, timing, and the like simultaneously with coded data.

B. Choi, Z. Li, W. Wang, W. Jiang, X. Xu, S. Wenger and S. Liu, "AHG9/AHG11: SEI messages for carriage of neural network information for post-filtering," JVET-V0091 (hereinafter referred to as NPL 1) and M. M. Hannuksela, E. B. Aksu, F. Cricri, H. R. Tavakoli and M. Santamaria, "AHG9: On post-filter SEI", JVET-X0112 (hereinafter referred to as NPL 2) disclose a method of explicitly defining SEI in which the topology and parameters of a neural network filter used as a post filter are transmitted, and a method of indirectly defining the SEI as reference information.

However, a problem with both NPL 1 and NPL 2 is that the neural network model needs to be analyzed because there is no information allowing simple determination of whether the neural network model can be performed. In NPL 1, an explicitly defined topology needs to be analyzed. Also, a problem with NPL 2 is that the complexity cannot be obtained without analysis of the topology of the neural network model indicated based on the URI.

A problem with both NPL 1 and NPL 2 is that the input and output of the post-filtering processing are not explicitly defined.

A problem with NPL 2 is that no color space nor chroma sampling for output is indicated, preventing determination, from supplemental enhancement information, of what output is obtained.

In NPL 1 and NPL 2, the types of input and output tensors can be analyzed from the topology of the neural network, but the relationship between the channel of the tensor and color components cannot be determined. For example, NPL 1 and NPL 2 do not define how luma channels and chroma channels are set for the input tensor and in what color space the processed output tensor is output. Accordingly, a problem is that processing cannot be identified to be performed. The widths and heights of luma and chroma vary depending on the color sampling of 4:0:0, 4:2:0, 4:2:2, or 4:4:4, and what processing is to be executed to derive the input tensor cannot be determined. How to generate an image from the output tensor depending on the color sample cannot be determined as well.

SUMMARY

An image decoding apparatus for decoding information specifying a neural network, according to an aspect of the present disclosure includes: header decoding circuitry that decodes an input tensor identification parameter specifying a process for deriving an input tensor input for a post filter of the neural network. The input tensor identification parameter is a parameter related to a color component channel.

An image encoding apparatus for encoding information specifying a neural network, according to an aspect of the present disclosure includes: header encoding circuitry that encodes an input tensor identification parameter specifying a process for deriving an input tensor input for a post filter of the neural network. The input tensor identification parameter is a parameter related to a color component channel.

An image decoding method for decoding information specifying a neural network, according to an aspect of the present disclosure includes: decoding an input tensor identification parameter specifying a process for deriving an input tensor input for a post filter of the neural network. The input tensor identification parameter is a parameter related to a color component channel.

This configuration allows reference to the complexity of a neural network model indicated by an NN filter without analyzing a neural network model indicated by a URI. This allows the effect of facilitating determination of whether the video decoding apparatus has the processing capability of a post filter using a neural network filter.

BRIEF DESCRIPTION OF THE DRAWINGS

FIG. 7 is a diagram illustrating a configuration of a syntax table of NN filter SEI according to the present embodiment.

FIG. 8 is a diagram illustrating a configuration of the syntax table of the NN filter SEI in a case that parameter types of a neural network model are separated into a numerical type and a bit width for description.

FIG. 9 is a diagram illustrating a configuration of the syntax table of the NN filter SEI in a case that the bit width, corresponding to a parameter type of the neural network model, is described in logarithmic representation.

FIG. 11 is a diagram illustrating a configuration of a syntax table of post-filter purpose SEI.

FIG. 14 is a diagram illustrating an example of syntax of the NN filter SEI.

FIG. 15 is a table illustrating an input data format defined by an NN filter.

FIG. 16 is a table illustrating an output data format defined by the NN filter.

FIG. 17 is a table illustrating a method for transforming a decoded image into an input data format defined by the NN filter.

FIG. 18 is a table illustrating a method for transforming an output data format defined by the NN filter into an output image.

DESCRIPTION OF THE EMBODIMENTS

First Embodiment

Hereinafter, an embodiment of the present disclosure will be described with reference to the drawings.

Figure 1:
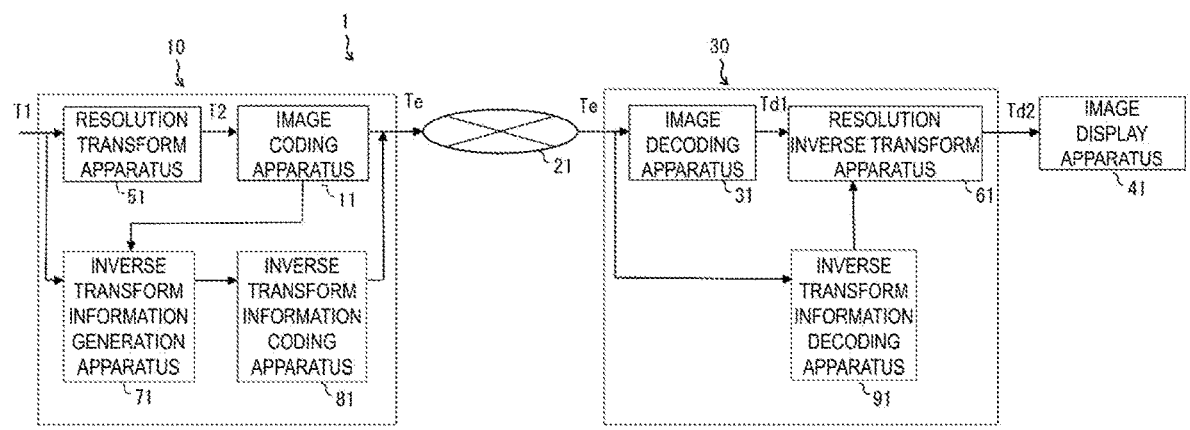
FIG. 1 is a schematic diagram illustrating a configuration of a video transmission system according to the present embodiment.

FIG. 1 is a schematic diagram illustrating a configuration of a video transmission system according to the present embodiment.

The video transmission system 1 is a system for transmitting coded data obtained by coding an image with a different resolution resulting from transformation, decoding the transmitted coded data, and inversely transforming the image into the original resolution for display. The video transmission system 1 includes a video coding apparatus 10, a network 21, a video decoding apparatus 30. and an image display apparatus 41.

The video coding apparatus 10 includes a resolution transform apparatus (resolution transformer) 51, an image coding apparatus (image coder) 11, an inverse transform information generation apparatus (inverse transform information generation unit) 71, an inverse transform information coding apparatus (inverse transform information coder) 81.

The video decoding apparatus 30 includes an image decoding apparatus (image decoder) 31, a resolution inverse transform apparatus (resolution inverse transformer) 61, and an inverse transform information decoding apparatus (inverse transform information decoder) 91.

The resolution transform apparatus 51 transforms the resolution of an image T1 included in a video, and supplies a variable resolution video T2 including the image with a different resolution to the image coding apparatus 11.

The inverse transform information generation apparatus 71 creates the inverse transform information based on the image T1 included in the video. The inverse transform information is derived or selected from the relationship between the input image T1, not subjected to the resolution transformation, and an image T17 resulting from the resolution transformation, coding, and decoding.

The inverse transform information is input to the inverse transform information coding apparatus 81. The inverse transform information coding apparatus 81 codes the inverse transform information to generate coded inverse transform information for transmission to the network 21.

The variable resolution image T2 is input to the image coding apparatus 11. The image coding apparatus 11 codes image size information of the input image in units of PPS by using the framework of the Reference Picture Resampling (RPR), and transmits the resultant image size information to the image decoding apparatus 31.

In FIG. 1, the inverse transform information coding apparatus 81 is not connected to the image coding apparatus 11, but the inverse transform information coding apparatus 81 and the image coding apparatus 11 may communicate the necessary information as appropriate.

The network 21 transmits the coded inverse transform information and coded data Te to the image decoding apparatus 31. Part or all of the coded inverse transform information may be included in the coded data Te as supplemental enhancement information SEI. The network 21 is the Internet, a Wide Area Network (WAN), a Local Area Network (LAN), or a combination thereof. The network 21 is not necessarily limited to a bidirectional communication network, and may be a unidirectional communication network configured to transmit broadcast waves of digital terrestrial television broadcasting, satellite broadcasting of the like. The network 21 may be substituted by a storage medium in which the coded data Te is recorded, such as a Digital Versatile Disc (DVD: trade name) or a Blue-ray Disc (BD: trade name).

The image decoding apparatus 31 decodes each coded data Te transmitted by the network 21 to generate a variable resolution decoded image for supply to the resolution inverse transform apparatus 61.

The inverse transform information decoding apparatus 91 decodes coded inverse transform information transmitted by the network 21 to generate inverse transform information for supply to the resolution inverse transform apparatus 61.

In FIG. 1, the inverse transform information decoding apparatus 91 is illustrated separately from the image decoding apparatus 31, but the inverse transform information decoding apparatus 91 may be included in the image decoding apparatus 31. For example, the inverse transform information decoding apparatus 91 may be included in the image decoding apparatus 31 separately from each of the functional units of the image decoding apparatus 31. In FIG. 1, the inverse transform information decoding apparatus 91 is not connected to the image decoding apparatus 31, but the inverse transform information decoding apparatus 91 and the image decoding apparatus 31 may communicate necessary information as appropriate.

In a case that the resolution transform information indicates resolution transform, the resolution inverse transform apparatus 61 generates a decoded image with the original size by inversely transforming the image with the transformed resolution, based on the image size information included in the coded data, through super-resolution processing using the neural network.

The image display apparatus 41 displays all or some of one or multiple decoded images Td2 received from the resolution inverse transform apparatus 61. For example, the image display apparatus 41 includes a display device such as a liquid crystal display and an organic Electro-Luminescence (EL) display. Forms of the display include a stationary type, a mobile type, an HMD type, and the like. In a case that the image decoding apparatus 31 has a high processing capability, the image display apparatus 41 displays an image having high image quality. In a case that the image decoding apparatus 31 has a lower processing capability, the image display apparatus 41 displays an image which does not require high processing capability and display capability.

Figure 3:
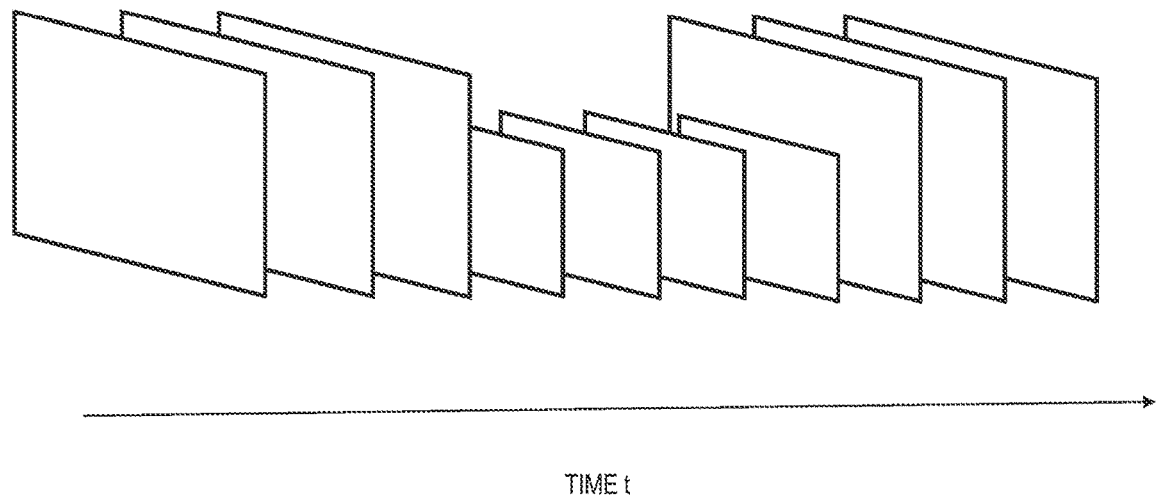
FIG. 3 is a conceptual diagram of an image to be processed in the video transmission system according to the present embodiment.

FIG. 3 is a conceptual diagram of an image to be processed in the video transmission system illustrated in FIG. 1, and is a diagram illustrating a change in resolution of the image over time. Note that FIG. 3 does not indicate whether the image is coded. FIG. 3 illustrates an example in which, during the processing process of the video transmission system, an image with a reduced resolution is transmitted to the image decoding apparatus 31. As illustrated in FIG. 3, typically, the resolution transform apparatus 51 performs a transform for reducing the resolution of the image to decrease the amount of information to be transmitted.

Operator

Operators used in the present specification will be described below.

>> is a right bit shift, << is a left bit shift, & is a bitwise AND, | is a bitwise OR, |= is an OR assignment operator, and || indicates a logical sum.

x?y: z is a ternary operator that takes y in a case that x is true (other than 0) and takes z in a case that x is false (0).

Clip3(a, b, c) is a function to clip c in a value of a to b, and a function to return a in a case that c is less than a (c<a), return b in a case that c is greater than b (c>b), and return c in the other cases (provided that a is less than or equal to b (a<=b)).

abs (a) is a function that returns the absolute value of a.

Int (a) is a function that returns the integer value of a.

floor (a) is a function that returns the maximum integer equal to or less than a.

ceil (a) is a function that returns the minimum integer equal to or greater than a.

a/d represents division of a by d (round down decimal places).

a^b represents power (a, b). For a=2, a^b is equal to 1<<b.

Structure of Coded Data Te

Prior to the detailed description of the image coding apparatus 11 and the image decoding apparatus 31 according to the present embodiment, a data structure of the coded data Te generated by the image coding apparatus 11 and decoded by the image decoding apparatus 31 will be described.

Figure 2:
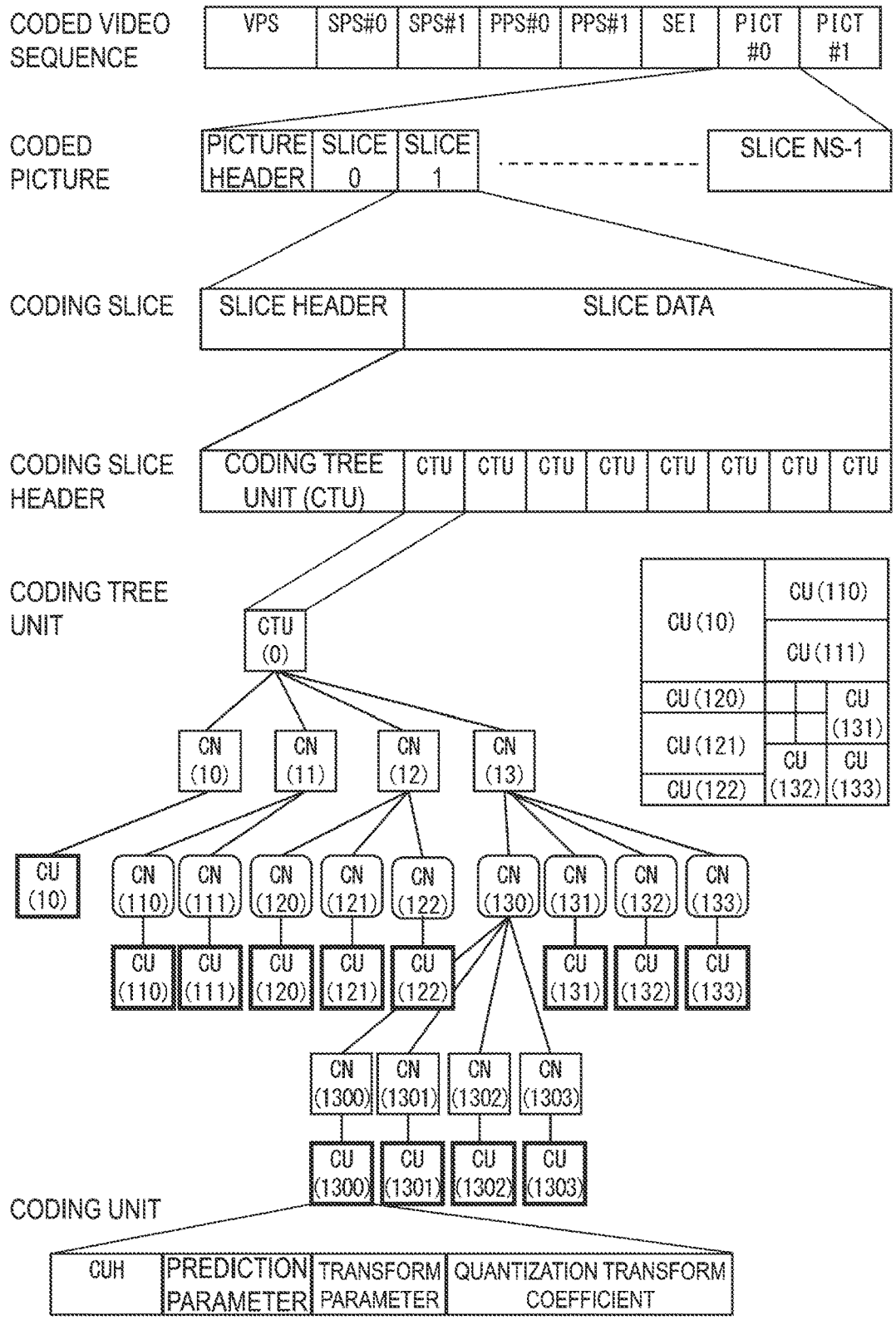
FIG. 2 is a diagram illustrating a hierarchical structure of coded data.

FIG. 2 is a diagram illustrating the hierarchy structure of data in the coded data Te. The coded data Te includes a sequence and multiple pictures constituting the sequence illustratively. FIG. 2 is a diagram illustrating a coded video sequence defining a sequence SEQ, a coded picture prescribing a picture PICT, a coding slice prescribing a slice S, a coding slice data prescribing slice data, a coding tree unit included in the coding slice data, and a coding unit included in the coding tree unit.

Coded Video Sequence

In the coded video sequence, a set of data referred to by the image decoding apparatus 31 to decode the sequence SEQ to be processed is defined. As illustrated in FIG. 2, the sequence SEQ includes a Video Parameter Set VPS, a Sequence Parameter Set SPS, a Picture Parameter Set PPS, an Adaptation Parameter Set (APS), a picture PICT, and Supplemental Enhancement Information SEI.

In the video parameter set VPS, in a video including multiple layers, a set of coding parameters common to multiple videos and a set of coding parameters associated with the multiple layers and an individual layer included in the video are defined.

In the sequence parameter set SPS, a set of coding parameters referred to by the image decoding apparatus 31 to decode a target sequence is defined. For example, a width and a height of a picture are defined. Note that multiple SPSs may exist. In that case, any of the multiple SPSs is selected from the PPS.

In the picture parameter set PPS, a set of coding parameters referred to by the image decoding apparatus 31 to decode each picture in a target sequence is defined.

Coded Picture

In the coded picture, a set of data referred to by the image decoding apparatus 31 to decode the picture PICT to be processed is defined. As illustrated in FIG. 2, the picture PICT includes a picture header PH and slices 0 to NS−1 (NS is the total number of slices included in the picture PICT).

In the description below, in a case that the slices 0 to NS−1 need not be distinguished from one another, subscripts of reference signs may be omitted. The same applies to other data with subscripts included in the coded data Te which will be described below.

Coding Slice

In the coding slice, a set of data referred to by the image decoding apparatus 31 to decode the slice S to be processed is defined. As illustrated in FIG. 2, the slice includes a slice header and slice data.

The slice header includes a coding parameter group referenced by the image decoding apparatus 31 to determine a decoding method for a target slice. Slice type indication information (slice_type) indicating a slice type is one example of a coding parameter included in the slice header.

Examples of slice types that can be indicated by the slice type indication information include (1) I slices for which only an intra prediction is used in coding, (2) P slices for which a uni-prediction (L0 prediction) or an intra prediction is used in coding, and (3) B slices for which a uni-prediction (L0 prediction or L1 prediction), a bi-prediction, or an intra prediction is used in coding, and the like. Note that the inter prediction is not limited to a uni-prediction and a bi-prediction, and the prediction image may be generated by using a larger number of reference pictures. Hereinafter, in a case of being referred to as the P or B slice, a slice that includes a block in which the inter prediction can be used is indicated.

Note that the slice header may include a reference to the picture parameter set PPS (pic_parameter_set_id).

Coding Slice Data

In the coding slice data, a set of data referenced by the image decoding apparatus 31 to decode the slice data to be processed is defined. The slice data includes CTUs as illustrated in the coding slice header in FIG. 2. The CTU is a block of a fixed size (for example, 64×64) constituting a slice, and may also be called a Largest Coding Unit (LCU).

Coding Tree Unit

In FIG. 2, a set of data is defined that is referenced by the image decoding apparatus 31 to decode the CTU to be processed. The CTU is split into coding units CUs, each of which is a basic unit of coding processing, by a recursive quad tree split, binary tree split, or ternary tree split. Nodes of a tree structure obtained by recursive quad tree splits are referred to as Coding Nodes. Intermediate nodes of a quad tree, a binary tree, and a ternary tree are coding nodes, and the CTU itself is also defined as the highest coding node.

Coding Unit

In FIG. 2, a set of data referenced by the image decoding apparatus 31 to decode the coding unit to be processed is defined. Specifically, the CU includes a CU header CUH, a prediction parameter, a transform parameter, a quantization transform coefficient, and the like. In the CU header, a prediction mode and the like are defined.

There are cases that the prediction processing is performed in units of CU or performed in units of sub-CU in which the CU is further split.

There are two types of predictions (prediction modes), which are intra prediction and inter prediction. The intra prediction refers to a prediction in an identical picture, and the inter prediction refers to prediction processing performed between different pictures (for example, between pictures of different display times, and between pictures of different layer images).

Transform and quantization processing is performed in units of CU, but the quantization transform coefficient may be subjected to entropy coding in units of subblock such as 4×4.

Note that, in a case that the present specification mentions "a flag indicating whether or not XX", a flag being other than 0 (for example, 1) assumes a case of XX, and a flag being 0 assumes a case of not XX, and 1 is treated as true and 0 is treated as false in a logical negation, a logical product, and the like (hereinafter, the same is applied). However, other values can be used for true values and false values in real apparatuses and methods.

Configuration of Image Decoding Apparatus

Figure 4:
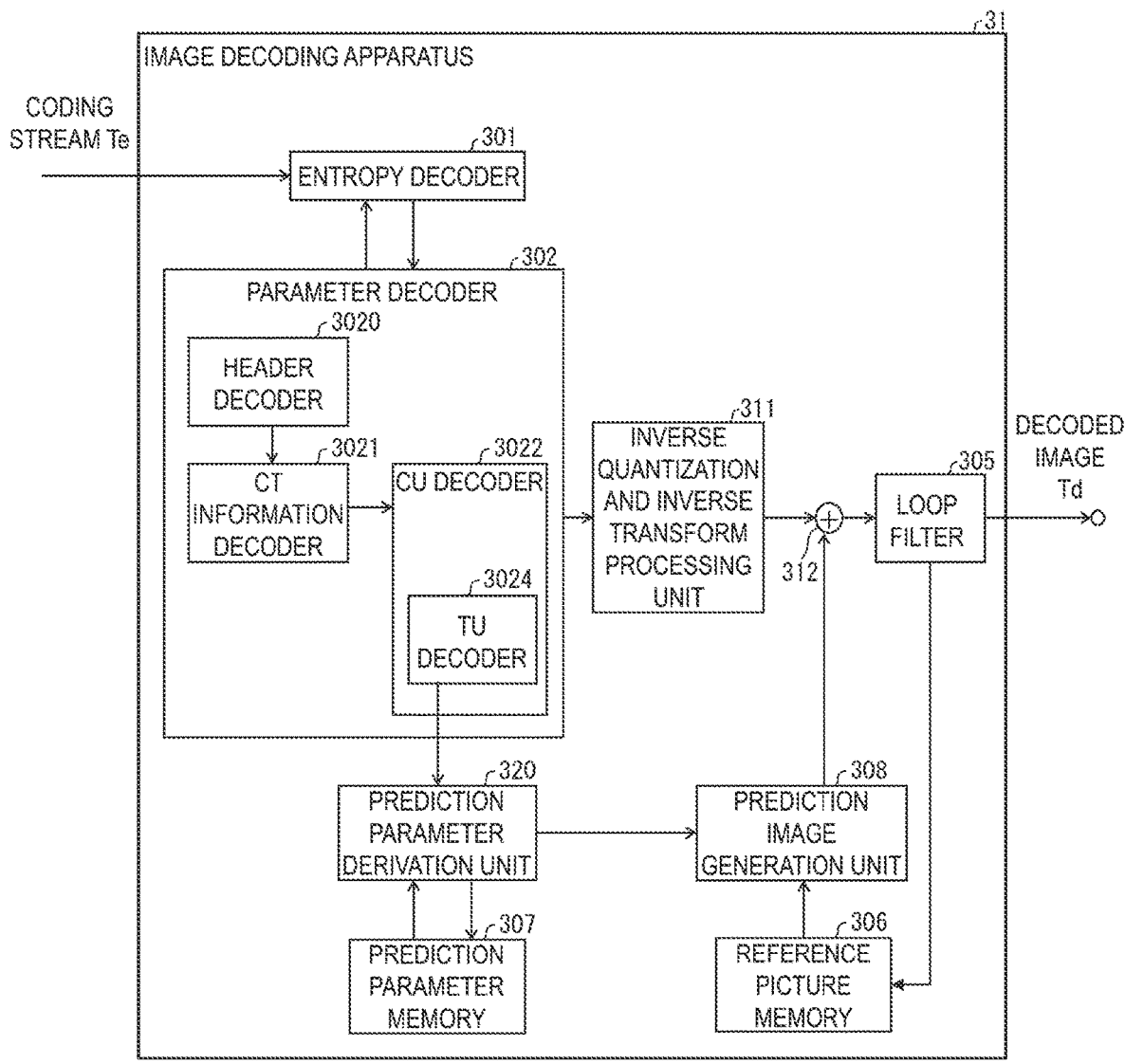
FIG. 4 is a schematic diagram illustrating a configuration of an image decoding apparatus.

The configuration of the image decoding apparatus 31 (FIG. 4) according to the present embodiment will be described.

The image decoding apparatus 31 includes an entropy decoder 301, a parameter decoder (a prediction image decoding apparatus) 302, a loop filter 305, a reference picture memory 306, a prediction parameter memory 307, a prediction image generation unit (prediction image generation apparatus) 308, an inverse quantization and inverse transform processing unit 311, an addition unit 312, and a prediction parameter derivation unit 320. Note that a configuration in which the loop filter 305 is not included in the image decoding apparatus 31 may be used depending on the image coding apparatus 11 described below.

The parameter decoder 302 further includes a header decoder 3020, a CT information decoder 3021, and a CU decoder 3022 (prediction mode decoder), and the CU decoder 3022 further includes a TU decoder 3024. These may be collectively referred to as a decoding module. The header decoder 3020 decodes, from coded data, parameter set information such as the VPS, the SPS, the PPS, and the APS, and the slice header (slice information). The CT information decoder 3021 decodes a CT from coded data. The CU decoder 3022 decodes a CU from coded data. In a case that a TU includes a prediction error, the TU decoder 3024 decodes QP update information (quantization correction value) and quantization prediction error (residual_coding) from coded data.

The TU decoder 3024 decodes QP update information and quantization prediction error from coded data.

The prediction parameter derivation unit 320 includes an inter prediction parameter derivation unit 303 and an intra prediction parameter derivation unit 304.

The entropy decoder 301 performs entropy decoding on the coded data Te input from the outside and decodes individual codes (syntax elements).

The entropy decoder 301 outputs the decoded codes to the parameter decoder 302. Which code is to be decoded is controlled based on an indication of the parameter decoder 302.

Basic Flow of Operation

Figure 5:
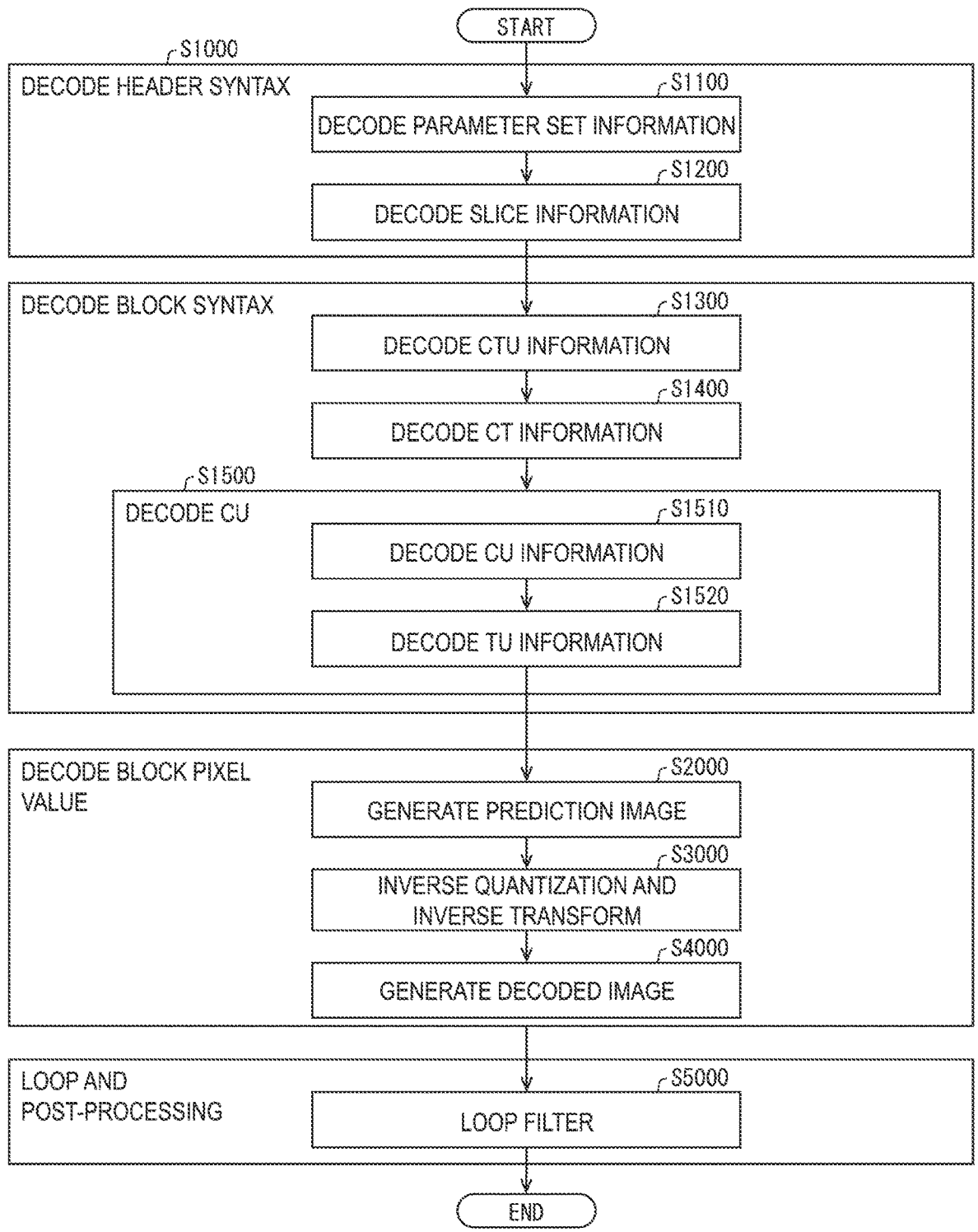
FIG. 5 is a flowchart illustrating general operation of the image decoding apparatus.

FIG. 5 is a flowchart illustrating general operation of the image decoding apparatus 31.

(S1100: Decoding of parameter set information) The header decoder 3020 decodes parameter set information such as the VPS, the SPS, and the PPS from coded data.

(S1200: Decoding of slice information) The header decoder 3020 decodes a slice header (slice information) from the coded data.

Afterwards, the image decoding apparatus 31 repeats the processing from S1300 to S5000 for each CTU included in the target picture, and thereby derives a decoded image of each CTU.

(S1300: Decoding of CTU information) The CT information decoder 3021 decodes the CTU from the coded data.

(S1400: Decoding of CT information) The CT information decoder 3021 decodes the CT from the coded data.

(S1500: Decoding of CU) The CU decoder 3022 decodes the CU from the coded data by performing S1510 and S1520.

(S1510: Decoding of CU information) The CU decoder 3022 decodes the CU information and the prediction information from the coded data.

(S1520: Decoding of TU information) In a case that a prediction error is included in the TU, the TU decoder 3024 decodes, from the coded data, QP update information and a quantization prediction error. Note that the QP update information is a difference value from a quantization parameter prediction value qPpred, which is a prediction value of a quantization parameter QP.

(S2000: Generation of prediction image) The prediction image generation unit 308 generates a prediction image, based on the prediction information, for each block included in the target CU.

(S3000: Inverse quantization and inverse transform) The inverse quantization and inverse transform processing unit 311 performs inverse quantization and inverse transform processing on each TU included in the target CU.

(S4000: Generation of decoded image) The addition unit 312 generates a decoded image of the target CU by adding the prediction image supplied by the prediction image generation unit 308 and the prediction error supplied by the inverse quantization and inverse transform processing unit 311.

(S5000: Loop filter) The loop filter 305 generates a decoded image by applying a loop filter such as a deblocking filter, an SAO, and an ALF to the decoded image.

The loop filter 305 is a filter provided in the coding loop, and is a filter that removes block distortion and ringing distortion and improves image quality. The loop filter 305 applies a filter such as a deblocking filter, a Sample Adaptive Offset (SAO), and an Adaptive Loop Filter (ALF) on a decoded image of a CU generated by the addition unit 312.

The reference picture memory 306 stores a decoded image of the CU in a predefined position for each target picture and target CU.

The prediction parameter memory 307 stores the prediction parameter in a predefined position for each CTU or CU. Specifically, the prediction parameter memory 307 stores the parameter decoded by the parameter decoder 302, the parameter derived by the prediction parameter derivation unit 320, and the like.

Parameters derived by the prediction parameter derivation unit 320 are input to the prediction image generation unit 308.

The prediction image generation unit 308 reads a reference picture from the reference picture memory 306. The prediction image generation unit 308 generates a prediction image of a block or a subblock by using the parameters and the reference picture (reference picture block) in the prediction mode indicated by predMode. Here, the reference picture block refers to a set of pixels (referred to as a block because they are normally rectangular) on a reference picture and is a region that is referenced for generating a prediction image.

The inverse quantization and inverse transform processing unit 311 performs inverse quantization on a quantization transform coefficient input from the parameter decoder 302 to calculate a transform coefficient.

The addition unit 312 adds the prediction image of the block input from the prediction image generation unit 308 and the prediction error input from the inverse quantization and inverse transform processing unit 311 for each pixel, and generates a decoded image of the block. The addition unit 312 stores the decoded image of the block in the reference picture memory 306, and also outputs it to the loop filter 305.

The inverse quantization and inverse transform processing unit 311 performs inverse quantization on a quantization transform coefficient input from the parameter decoder 302 to calculate a transform coefficient.

The addition unit 312 adds the prediction image of the block input from the prediction image generation unit 308 and the prediction error input from the inverse quantization and inverse transform processing unit 311 for each pixel, and generates a decoded image of the block. The addition unit 312 stores the decoded image of the block in the reference picture memory 306, and also outputs it to the loop filter 305.

Configuration Example of NN Filter Unit 611

Figure 12:
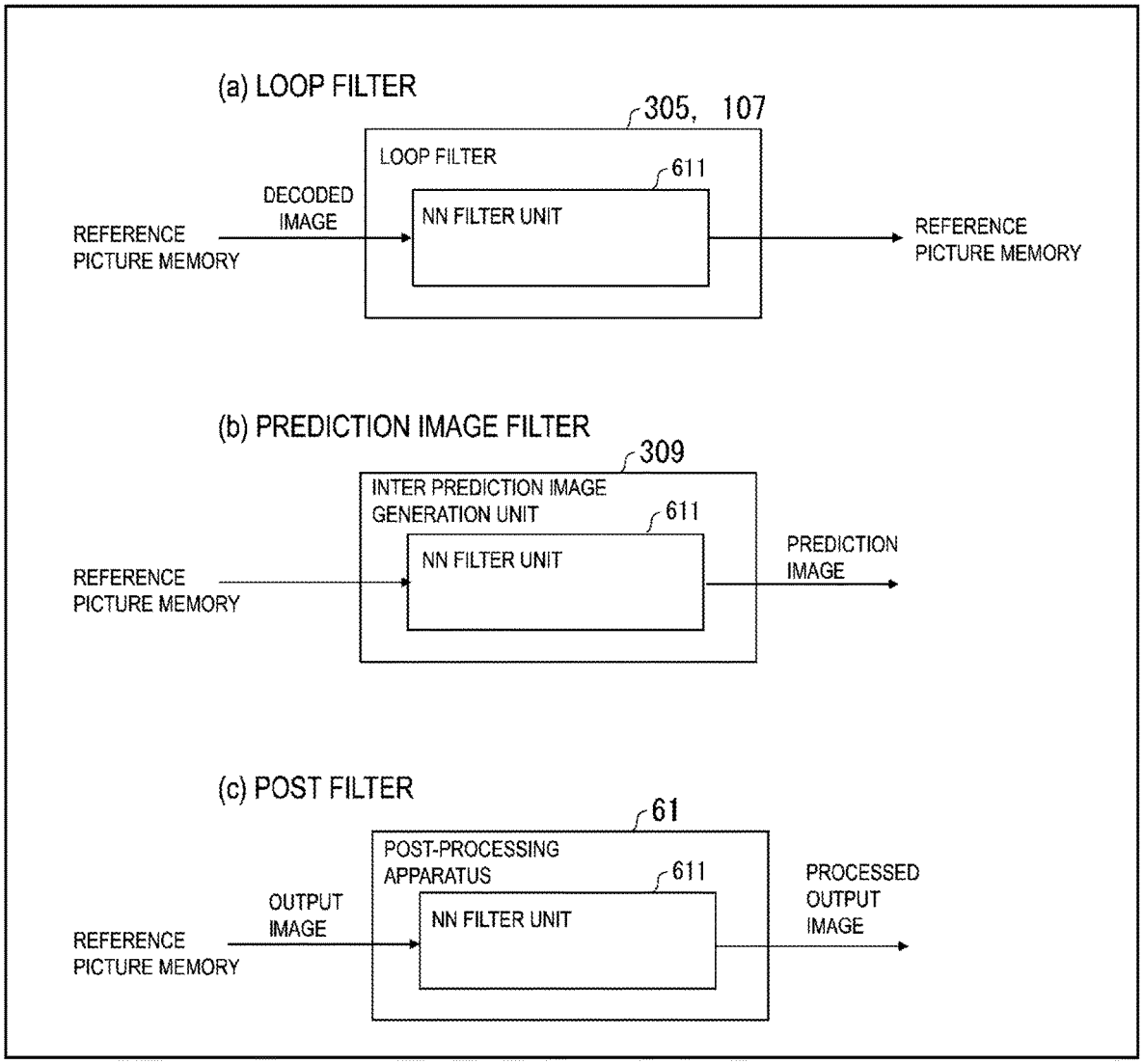
FIG. 12 is a diagram illustrating a configuration of a neural network of the NN filter unit 611.

FIG. 12 is a diagram illustrating configuration examples of a prediction image filter, a loop filter, and a post filter using the neural network filter unit (NN filter unit 611). The following describes an example of a post filter, but a prediction image filter or a loop filter may be used.

The resolution inverse transform apparatus (resolution inverse transformer) 61 of the video decoding apparatus 30 includes the NN filter unit 611. When an image is output from the reference picture memory 306, the NN filter unit 611 performs filtering processing to output the image. The output image may be subjected to display, file export, re-encoding (transcode), transmission, or the like. The NN filter unit 611 is a means for performing filtering processing on the input image by using the neural network model. At the same time, the NN filter unit 611 may perform reduction and enlargement by a factor of 1 or any rational number.

Here, the neural network model (hereinafter referred to as the NN model) means elements of the neural network and a coupling relationship (topology) of the elements, and parameters of the neural network (weight and bias). Note that, the parameters of the neural network model may be switched without changing the topology.

Details of NN Filter Unit 611

The NN filter unit performs filtering processing based on the neural network model by using an input image inSamples and input parameters (e.g., QP, bS, and the like).

The input image may be an image for each component, or may be an image including multiple components each as a channel. The input parameters may be assigned to a channel different from one for the image.

The NN filter unit may repeatedly apply the following processing.

As indicated in the equation below, a kernel k[m][i][j] is convoluted (conv) with inSamples, and a bias is added to the result of the convolution to derive an output image outSamples. Here, nn=0, . . . n−1, xx=0 . . . width−1, and yy=0 . . . height−1.

outSamples[nn][xx][yy]=ΣΣΣ(k[mm][i][j]*inSamples [mm][xx+i−of][yy+j−of]+bias[nn])

For 1×1 Conv, each τ represents the sum of mm=0 . . . m−1, i=0, and j=0. At this time, of =0 is set. For 3×3 Cony, each Σ represents the sum of mm=0 . . . m−1, i=0 . . . 2, and j=0 . . . 2. At this time, of =1 is set. n is the number of channels of outSamples, m is the number of channels of inSamples, width is the widths of inSamples and outSamples, and height is the heights of inSamples and outSamples. of is the size of a padding area provided around inSamples to make inSamples and outSamples identical in size. Hereinafter, in a case that the output of the NN filter unit is a value (correction value) instead of an image, the output is represented by corrNN instead of outSamples.

Processing may also be performed that is referred to as Depth wise Cony and indicated by the following equation. Here, nn=0, . . . n−1, xx=0 . . . width−1, and yy=0 . . . height−1.

outSamples[nn][xx][yy]=ΣΣ(k[nn][i][j]*inSamples[nn] [xx+i−of][yy+j−of]+bias[nn])

Σ represents the sum for each i and j. n is the number of channels of each of outSamples and inSamples, width is the width of each of inSamples and outSamples, and height is the height of each of inSamples and outSamples.

Non-linear processing referred to as Activate, for example, ReLU may be used.

ReLU(x)=x>=0?x:0 leakyReLU represented by the following equation may also be used.

leakyReLU(x)=x>=0?x:a*x

Here, a is a prescribed value, for example, 0.1 or 0.125. For integer calculation, the values of all of k, bias, and a may be integers, and the right shift may be performed after cony.

For ReLU, 0 is always output for a value less than 0, and the input value is directly output for a value equal to or greater than 0. On the other hand, for leakyReLU, for a value less than 0, linear processing is performed at a gradient set by a. For ReLU, the gradient is lost for a value of less than 0, and this may make learning difficult to progress. For leakyReLU, the gradient for a value less than 0 is left, making the above-described problem less likely to occur. For leakyReLU (x) described above, PReLU may be used that uses a parameterized value of a.

SEI for Referencing of Complexity of Neural Network Model

FIG. 7 is a diagram illustrating a configuration of a syntax table of NN filter SEI according to the present embodiment. The present SEI includes information regarding the complexity of a neural network model.

nnrpf_id: the identification number of the NN filter.

nnrpf_mode_idc: an index indicating the mode of an indication method for the neural network model used in the NN filter. A value of 0 indicates that the NN filter associated with nnrpf_id is not indicated in this SEI message. A value of 1 indicates that the NN filter associated with nnrpf_id is a neural network model identified by a prescribed Uniform Resource Identifier (URI). The URI is a string for identification indicating a logical or physical resource. Note that no actual data needs to be present at a location indicated by the URI and that it is sufficient for the string to be able to identify a resource. A value of 2 indicates that the NN filter associated with nnrpf_id is a neural network model represented by an ISO/IEC 15938-17 bit stream included in this SEI message. A value of 3 indicates that the NN filter associated with nnrpf_id is a neural network identified in the NN filter SEI message used in previous decoding, the neural network being updated by the ISO/IEC 15938-17 bit stream included in the SEI message.

nnrpf_persistence_flag: a flag indicating the persistence of the SEI message for the current layer. A value of 0 indicates that the SEI message is applied only to the current decoded picture. A value of 1 indicates that the SEI message is applied to the current decoded picture and the subsequent pictures in order of output.

nnrpf_uri[i]: a string that stores the reference destination URI of the neural network model used as the NN filter. i is the index of i-th byte of a UTF-8 string terminating with NULL.

nnrpf_payload_byte[i]: indicates the i-th byte of a bit stream complying with ISO/IEC 15938-17.

For nnrpf_mode_idc==1, the header coder 1110 and the header decoder 3020 decode nnrpf_uri corresponding to a URI indicating the neural network model used as the NN filter. The neural network model corresponding to the string indicated by nnrpf_uri is read from a memory provided in the video coding apparatus or the video decoding apparatus or via the network externally.

As neural network model complexity information (network model complexity information), the NN filter SEI includes the following syntax elements.

nnrpf_parameter_type_idc: an index indicating a variable type included in the parameters of the NN model. For a value of 0, the NN model uses only an integer type. For a value of 1, the NN model uses a floating point type or the integer type.

nnrpf_num_parameters_idc: an index indicating the number of parameters of the NN model used in the post filter. A value of 0 indicates that the number of parameters of the NN model is not defined. For a value other than 0, the number of parameters of the NN model is derived by the following processing using nnrpf_num_parameters_idc.

The header coder 1110 and the header decoder 3020 may derive the maximum value MaxNNParameters of the number of parameters of the NN model based on nnrpf_num_parameters_idc as follows, and code and decode the network model complexity information.

MaxNNParameters=
    (UNITPARAM<<nnrpf_num_parameters_idc)−1

Here, UNITPARAM may be a prescribed constant, and UNITPARAM=2048=2^11 may be set. Note that the shift operation has the same value as the index number and may be as follows.

MaxNNParameters=2^(nnrpf_num_parameters_idc+
    11)−1

The unit of the number of parameters may be, instead of a multiple of 2, a combination of a multiple of 2 and a multiple of 1.5 as follows.

MaxNNParameters=(nnrpf_num_parameters_idc &
    1)?
    (UNITPARAM2<<nnrpf_num_parameters_idc)−
    1:(UNITPARAM<<nnrpf_num_parameters_idc)−1

Here, UNITPARAM2 may be a prescribed constant corresponding to UNITPARAM*1.5. For example, for UNITPARAM=2048, UNITPARAM2=3072.

The following may be performed.

MaxNNParameters=(nnrpf_num_parameters_idc &
    1): 2^(nnrpf_num_parameters_idc+11)*1.5−1:2^
    (nnrpf_num_parameters_idc+11)−1

That is, the header coder 1110 sets the value of nnrpf_parameter_type_idc equal to a value making the number of parameters of the actual NN model equal to or less than MaxNNParameters. The header decoder 3020 decodes coded data set as described above.

Note that a linear representation may be used for the derivation of MaxNNParameters.

MaxNNParameters=
    (UNITPARAM*nnrpf_num_parameters_idc)−1

At this time, UNITPARAM=10000 may be set. UNITPARAM preferably has a value of 1000 or more, and the value is preferably a multiple of 10.

nnrpf_num_kmac_operations_idc: a value indicating the magnitude of the number of operations required for processing of the post filter. The header coder 1110 and the header decoder 3020 calculate MaxNNOperations based on nnrpf_num_kmac_operations_idc described above, as follows. MaxNNOperations is the maximum number of operations required for the processing of the post filter.

MaxNNOperations=nnrpf_num_kmac_operations_idc*1000*picture
    width*picture height Here, picture width and picture height are the width and height of the picture input to the post filter.

That is, the video coding apparatus sets the value of MaxNNOperations according to the value of the number of operations nnrpf_num_kmac_operations required for the processing of the post filter.

By transmitting, coding, or decoding the syntax of the network model complexity information related to the amount of processing defined in units of a prescribed constant, the above-described configuration provides an effect in enabling the complexity to be simply transmitted. Furthermore, the use of a multiple of 10 leads to a value easily understood by human beings. The use of a value of 1000 or more enables the magnitude of the model to be suitably expressed by using a small number of divisions. This allows efficient transmission.

In other words, the syntax indicating the network model complexity information indicates the upper limit of the number of parameters or the number of operations. The number of parameters or operations described above is defined in units of an exponential multiplier of 2.

The number of parameters or operations described above may be defined in units of an exponential multiplier of 2 or in units of 1.5 times an exponential multiplier of 2. The number of parameters or operations described above may also be defined in units of a multiple of 10.

By transmitting or coding or decoding the syntax of the network model complexity information related to the amount of processing defined by shift notation or exponential notation, the above-described configuration provides an effect in enabling the complexity to be efficiently transmitted with a short code.

nnrpf_alignment_zero_bit: a bit for byte alignment. The header coder 1110 and the header decoder 3020 code and decode the code "0" on a bit-by-bit basis until the bit position reaches the byte boundary.

nnrpf_operation_type_idc: an index indicating limitation of elements or topology used in the NN model of the post filter. The processing may be performed according to the value of the index, for example, as follows.

A value of 3 involves limitation of the elements or topology as described below. The kernel has a maximum size of 5×5 and a maximum channel number of 32. As an activation function, leaky ReLU or ReLU can be exclusively used. Branching has a maximum level of 3 (except skip connection).

For a value of 2, in addition to the above-described limitation, the use of the leaky Relu as an activation function and branching other than skip connection are prohibited (e.g., U-Net or grouping convolution is not used).

For a value of 1, furthermore, in addition to the above-described limitation, spatial channel mapping (e.g., Pixel Shuffler) and global average pooling are prohibited.

A value of 0 does not involve the limitation of the elements or topology.

Another Configuration Example 1

The parameter nnrpf_parameter_type_idc indicating the network model complexity information may be defined as follows.

nnrpf_parameter_type_idc: an index indicating the parameter type of the neural network model. For example, the parameter type may be determined according to the value of the parameter as follows.

A value of 0 is defined to indicate an 8-bit unsigned integer type, a value of 1 is defined to indicate a 16-bit unsigned integer type, a value of 2 is defined to indicate a 32-bit unsigned integer type, a value of 3 is defined to indicate a 16-bit floating-point type (bfloat16), a value of 4 is defined to indicate a 16-bit floating-point type (half precision), and a value of 5 is defined to indicate a 32-bit floating-point type (single precision).

Another Configuration Example 2

FIG. 8 is a diagram illustrating a configuration of the syntax table of the NN filter SEI including the network model complexity information. In this example, the parameter types of the neural network model are separated into a numerical type and a bit width for definition.

The parameter nnrpf_parameter_type_idc indicating the network model complexity information may be defined as follows.

nnrpf_parameter_type_idc: an index indicating the numerical type of the neural network model. For example, the numerical type may be determined according to the value of the parameter as follows.

A value of 0 is defined to indicate the integer type, and a value of 1 is defined to indicate the floating-point type.

In addition to the SEI syntax of FIG. 7, this configuration example includes the following syntax information.

nnrpf_parameter_bit_width_idc: an index indicating the bit width of the neural network model. For example, the bit width may be determined according to the value of the parameter as follows.

A value of 0 is defined to indicate 8 bits, a value of 1 is defined to indicate 16 bits, and a value of 2 is defined to indicate 32 bits.

Another Configuration Example 3

FIG. 9 is a diagram illustrating a configuration of a syntax table of NN filter SEI including network model complexity information. Here, the bit width, corresponding to a parameter type of the neural network model, is defined by logarithmic representation.

Instead of nnrpf_parameter_bit_width_idc in FIG. 8, this configuration example includes the following syntax information.

nnrpf_log 2_parameter_bit_width_minus3: based on nnrpf_log 2_parameter_bit_width_minus3 corresponding to a value indicating, in logarithmic representation of 2, the bit width of a parameter of the neural network model, the bit width of the parameter parameterBitWidth is calculated as follows.

parameterBitWidth=1<<(nnrpf_log 2_parameter_bit_width_minus3+3)

Decoding and Post-Filtering Processing of SEI

The header decoder 3020 decodes the network model complexity information from the SEI message defined in FIGS. 7 to 9. The SEI is supplemental enhancement information of processing related to decoding or display. The supplemental enhancement information is information indicating what to select.

Figure 10:
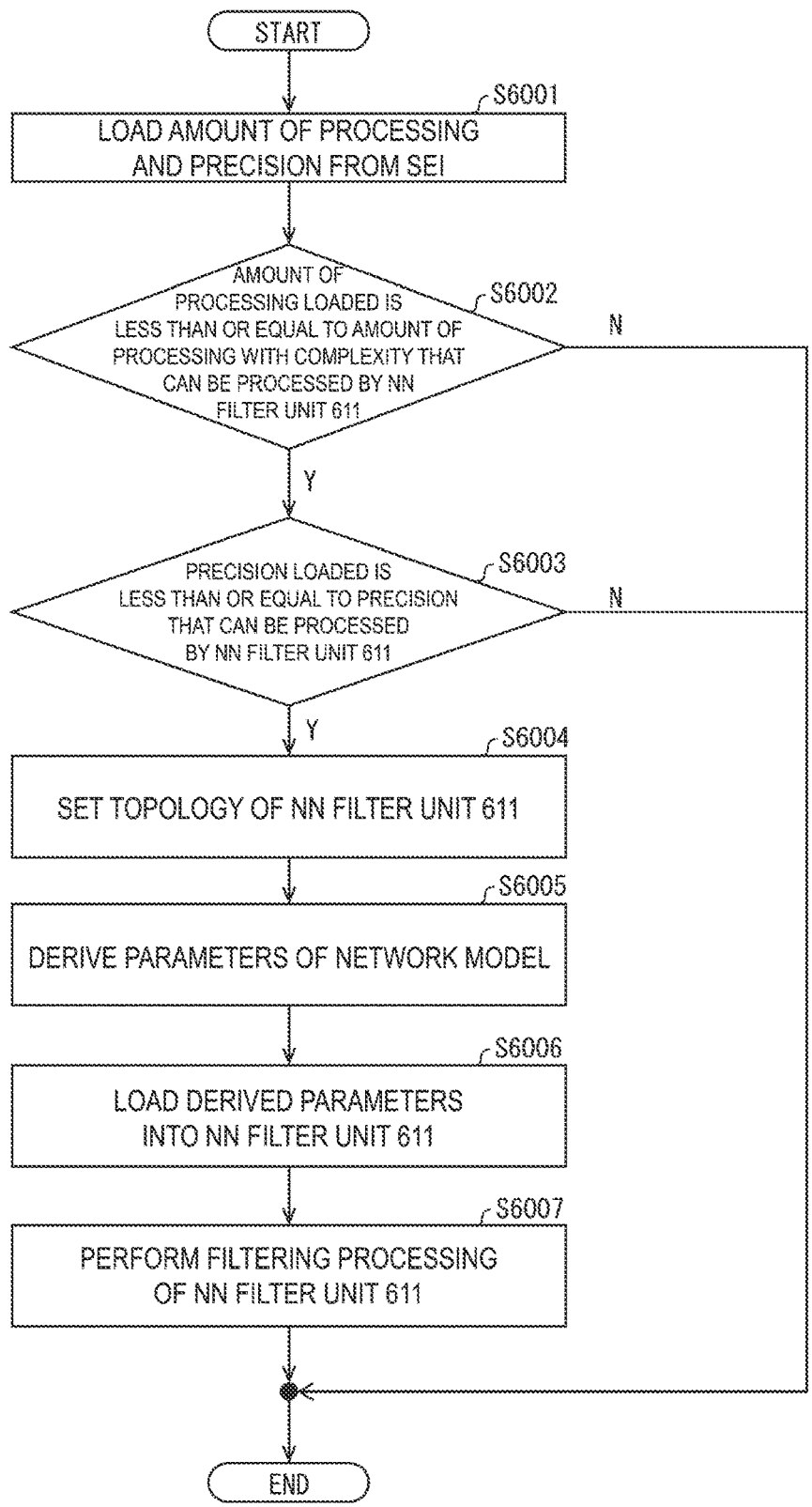
FIG. 10 is a diagram illustrating a flowchart of processing of an NN filter unit 611.

FIG. 10 is a diagram illustrating a flowchart of processing of the NN filter unit 611. The NN filter unit 611 performs the following processing according to the parameters of the SEI message described above.

S6001: The NN filter unit 611 loads the amount of processing and precision from the network model complexity information of the SEI.

S6002: In a case of exceeding the complexity that can be processed by the NN filter unit 611, the processing ends. Otherwise, the processing proceeds to S6003.

S6003: In a case of exceeding the precision that can be processed by the NN filter unit 611, the processing ends. Otherwise, the processing proceeds to S6004.

S6004: The NN filter unit 611 identifies the network model from the SEI based on the URI, and sets the topology of the NN filter unit 611.

S6005: The NN filter unit 611 derives the parameters of the network model from the update information of the SEI.

S6006: The NN filter unit 611 loads the derived parameters of the network model.

S6007: The NN filter unit 611 performs filtering processing, and outputs the result.

Note that, no SEI is required to construct a luma sample or a chroma sample in decoding processing.

SEI for Referencing of Neural Network Model Data Format

FIG. 14 is a diagram illustrating another configuration of a syntax table of NN filter SEI according to the present embodiment. The SEI includes information in the neural network model data format. For the same information as the SEI including the information of the neural network model complexity described above, the description is omitted.

nnrpf_input_format_idc: input tensor identification parameter. The parameter indicates the format of input data (input tensor) for the NN model used in the NN filter. As illustrated in FIG. 15, the header decoder 3020 derives the format of the input data based on the value of nnrpf_input_format_idc.

For nnrpf_input_format_idc=0, the format of the input data includes three-dimensional data (3D tensor) of one channel (luma). This indicates that the luma channel of a decoded image from the image decoding apparatus 31 is used as input data to the post filter. Note that in the present example, the three dimensions of the three-dimensional data are defined to be in the order of (C, H, W) but that the order of the dimensions is not limited to this. For example, in an alternative configuration, the data may be stored in the order of (H, W, C). In this case, since the number of channels is one, two-dimensional data (H, W) may be used.

For nnrpf_input_format_idc==1, the format of the input data includes three-dimensional data (3D tensor) of two channels (chroma). This indicates that two chroma channels (U and V) of the decoded image from the image decoding apparatus 31 are used as input data to the post filter.

For nnrpf_input_format_idc==2, the format of the input data includes three-dimensional data (3D tensor) of three channels (one for luma and two for chroma). This indicates that the luma and two chroma channels of the decoded image from the image decoding apparatus 31 chroma are used as input data to the NN filter in 4:4:4 format.

For nnrpf_input_format_idc==3, the format of the input data includes three-dimensional data (3D tensor) of 6 channels (four for luma and two for chroma). This indicates that four channels derived from the luma channel and the two chroma channels of the decoded image in 4:2:0 format chroma are used as input data to the NN filter.

nnrpf_output_format_idc: an output tensor identification parameter. This indicates the format of the output data (NN output data and output tensor) from the NN model used in the NN filter. As illustrated in FIG. 16, the header decoder 3020 derives the format of the input data based on the value of nnrpf_output_format_idc.

For nnrpf_output_format_idc==0, the format of the NN output data includes three-dimensional data (3D tensor) of one channel (luma). This indicates that the output data from the NN filter is used as a luma channel of an output image from the video decoding apparatus 30.

For nnrpf_output_format_idc==1, the format of the NN output data includes three-dimensional data (3D tensor) of two channels (chroma). This indicates that the output data from the NN filter is used as two chroma channels (U and V) of the output image from the video decoding apparatus 30.

For nnrpf_output_format_idc=2, the format of the NN output data includes three-dimensional data (3D tensor) of 3 channels (one for luma and two for chroma). This indicates that the output data from the NN filter is used in 4:4:4 format as the luma and two chroma channels of the output image from the video decoding apparatus 30 chroma.

For nnrpf_output_format_idc==3, the format of the NN output data includes three-dimensional data (3D tensor) of 6 channels (four for luma and two for chroma). This indicates that the output data from the NN filter is used in 4:2:0 format as one luma channel derived by integrating four of the six channels and two chroma channels.

Processing of Post Filter SEI

In processing of the post filter SEI, the header coder 1110 and the header decoder 3020 may set the syntax value and variable of the image decoding apparatus equal to the variable of the NN filter unit 611 as follows.
PicWidthInLumaSamples=pps_pic_width_in_luma_samples
PicHeightInLumaSamples=pps_pic_height_in_luma_samples
ChromaFormatIdc=sps_chroma_format_idc
BitDepthY=BitDepthC=BitDepth
Here, pps_pic_width_in_luma_samples, pps_pic_height_in_luma_samples, and sps_chroma_format_idc are syntax values indicating image width, height, and sub-samples of color components, and BitDepth is the bit depth of the image.

The header coder 1110 and the header decoder 3020 derive the following variables according to ChromaFormatIdc(sps_chroma_format_idc).
SubWidthC=1. SubHeightC=1 (ChromaFormatIdc==0)
SubWidthC=2, SubHeightC=2 (ChromaFormatIdc==1)
SubWidthC=2, SubHeightC=1 (ChromaFormatIdc==2)
SubWidthC=1, SubHeightC=1 (ChromaFormatIdc==3)

The header coder 1110 and the header decoder 3020 derives, with the following variables, the image width and height of luma to be filtered and the picture width and height of chroma to be filtered.
LumaWidth=PicWidthInLumaSamples
LumaHeight=PicHeightInLumaSamples
ChromaWidth=PicWidthInLumaSamples/SubWidthC
ChromaHeight=PicHeightInLumaSamples/SubHeightC
SW=SubWidthC
SH=SubHeightC
SubWidthC(=SW) and SubHeightC(=SH) indicate sub-sampling of color components.

Here, SubWidthC(=SW) and SubHeightC(=SH) are each a variable representing the ratio of chroma resolution to luma resolution.

The header coder 1110 and the header decoder 3020 may derive an output image width outWidth and an output image height outHeight according to a scale value scale indicating the ratio as follows. outSW and outSH are chroma sub-sample values of the output image.

$$outLumaWidth = LumaWidth * scale$$

$$outLumaHeight = LumaHeight * scale$$

$$outChromaWidth = LumaWidth * scale / outSW$$

$$outChromaHeight = LumaHeight * scale / outSH$$

Transformation into NN Input Data by Post-Filter

To input image data to the NN filter, the NN filter unit 611 transforms a decoded image ComponentSample from the image decoding apparatus 31 into NN input data inputTensor [ ][ ][ ], corresponding to a three-dimensional array, as illustrated in FIG. 17 and below, based on the value of nnrpf_input_format_idc.

Hereinafter, x and y represent the coordinates of a luma pixel. ComponentSample[cIdx] is a two-dimensional array that stores the cIdx-th decoded sample pixel value of the decoded image. For example, in ComponentSample, the range of x is x=0 . . . LumaWidth−1, and the range of y is y=LumaHeight−1. cx and cy represent the coordinates of a chroma pixel, and the range of cx is cx=0 . . . ChromaWidth−1 and the range of cy is cy=ChromaHeight−1. The NN filter unit 611 described below processes these ranges. In a case that nnrpf_input_format_idc is 0 (pfp_component_idc==0), inputTensor is derived as follows:

$$inputTensor[0][y][x] = ComponentSample[0][x][y]$$

In a case that nnrpf_input_format_idc is 1 (pfp_component_idc==1), inputTensor is derived as follows:

$$inputTensor[0][cy][cx] = ComponentSample[1][cx][cy]$$

$$inputTensor[1][cy][cx] = ComponentSample[2][cx][cy]$$

Alternatively, the following may be used:

$$inputTensor[0][y/SH][x/SW] = ComponentSample[1][x/SW][y/SH]$$

inputTensor[1][y/SH][x/SW]=ComponentSample[2][x/SW][y/SH]

In a case that nnrpf_input_format_idc is 2 (pfp_component_idc==2), inputTensor is derived as follows:

inputTensor[0][y][x]=ComponentSample[0][x][y]

ChromaOffset=1<<(BitDepthC−1)

inputTensor[1][y][x]=ChromaFormatIdc==0?
ChromaOffset:ComponentSample[1][x/SW][y/SH]

inputTensor[2][y][x]=ChromaFormatIdc==0?
ChromaOffset:ComponentSample[2][x/SW][y/SH]

In a case that nnrpf_input_format_idc is 3, inputTensor is derived as follows:

inputTensor[0][cy][cx]=ComponentSample[0][cx*2][cy*2]

inputTensor[1][cy][cx]=ComponentSample[0][cx*2+1][cy*2]

inputTensor[2][cy][cx]=ComponentSample[0][cx*2][cy*2+1]

inputTensor[3][cy][cx]=ComponentSample[0][cx*2+1][cy*2+1]

ChromaOffset=1<<(BitDepthC−1)

inputTensor[4][cy][cx]=
ChromaFormatIdc==0?ChromaOffset: ComponentSample[1][cx][cy]

inputTensor[5][cy][cx]=
ChromaFormatIdc==0?ChromaOffset: ComponentSample[2][cx][cy]

In a case that ChromaFormatIdc is 0, ComponentSample is an image of only the luma channel. At this time, for the chroma data portion of inputTensor, the NN filter unit 611 may set a constant ChromaOffset derived from the bit depth. ChromaOffset may have any other value such as 0. As indicated in parentheses, the NN input data may be derived according to pfp_component_idc described below.

The NN filter unit 611 separates the luma image of one channel into four channels according to the pixel position and transforms the resultant image into input data. The NN filter unit 611 may perform the derivation as follows. In the following, the differences between 4:2:0 and 4:2:2 and 4:4:4 are absorbed by a variable indicating a color sub-sample, allowing processing without depending on the difference in color sample:

inputTensor[0][cy][cx]=ComponentSample[0][cx*2][cy*2]

inputTensor[1][cy][cx]=ComponentSample[0][cx*2+1][cy*2]

inputTensor[2][cy][cx]=ComponentSample[0][cx*2][cy*2+1]

inputTensor[3][cy][cx]=ComponentSample[0][cx*2+1][cy*2+1]

ChromaOffset=1<<(BitDepthC−1)

inputTensor[4][cy][cx]=
ChromaFormatIdc==0?ChromaOffset: ComponentSample[1][cx*2/SW][cy*2/SH]

inputTensor[5][cy][cx]=
ChromaFormatIdc==0?ChromaOffset: ComponentSample[2][cx*2/SW][cy*2/SH]

Since cx=x/2 and cy=y/2, the NN filter unit 611 may perform the derivation as follows for the ranges of x and y described above:

inputTensor[0][y/2][x/2]=ComponentSample[0][x/2*2][y/2*2]

inputTensor[1][y/2][x/2]=ComponentSample[0][x/2*2+1][y/2*2]

inputTensor[2][y/2][x/2]=ComponentSample[0][x/2*2][y/2*2+1]

inputTensor[3][y/2][x/2]=ComponentSample[0][x/2*2+1][y/2*2+1]

ChromaOffset=1<<(BitDepthC−1)

inputTensor[4][y/2][x/2]
=ChromaFormatIdc==0?ChromaOffset: ComponentSample[1][x/SW][y/SH]

inputTensor[5][y/2][x/2]=
ChromaFormatIdc==0?ChromaOffset: ComponentSample[2][x/SW][y/SH]

Note that the above-described processing may be performed according to numInChannels as described below.

Transformation from NN Output Data by Post Filter

The NN filter unit 611 derives an output image outSamples from NN output data outputTensor [ ][ ][ ], which is a three-dimensional array corresponding to output data from the NN filter, based on the value of nnrpf_output_format_idc. Specifically, as illustrated in FIG. 18 and below, the NN filter unit 611 derives an image as follows based on the value of nnrpf_output_format_idc and the chroma subsample values outSW and outSH of the output image. Hereinafter, x and y represent the coordinates of a luma pixel of the output image. For example, in outputSample, the range of x is x=0 . . . outLumaWidth−1, and the range of y is y=outLumaHeight−1. cx and cy represent the coordinates of a chroma pixel of the output image, and the range of cx is cx=0 . . . outChromaWidth−1 and the range of cy is cy=0 . . . outChromaHeight−1. The NN filter unit 611 described below processes these ranges. outSamplesL, outSamplesCb, and outSamplesCr respectively represent the luma channel, chroma (Cb) channel, chroma (Cr) channel of the output image.

In a case that nnrpf_output_format_idc is 0, the NN filter unit 611 derives outSamplesL as follows:

outSamplesL[x][y]=outputTensor[0][y][x]

In a case that nnrpf_output_format_idc is 1, the NN filter unit 611 derives outSamplesCb and outSamplesCr as follows:

outSamplesCb[cx][cy]=outputTensor[0][cy][cx]

outSamplesCr[cx][cy]=outputTensor[1][cy][cx]

In a case that nnrpf_output_format_idc is 2, the NN filter unit 611 derives outSamplesL as follows:

outSamplesL[x][y]=outputTensor[0][y][x]

At this time, the NN filter unit 611 derives outSamplesCb and outSamplesCr as follows:

outSamplesCb[x/outSW][y/outSH]=outputTensor[1][y][x]

outSamplesCr[$x$/out$SW$][$y$/out$SH$]=outputTensor[2][$y$][$x$]

Alternatively, the NN filter unit 611 may derive outSamplesCb and outSamplesCr as follows:

outSamplesCb[$cx$][$cy$]=outputTensor[1][$cy$*out$SH$][$cx$*out$SW$]

outSamplesCr[$cx$][$cy$]=outputTensor[2][$cy$*out$SH$][$cx$*out$SW$]

In a case that nnrpf_output_format_idc is 3, the NN filter unit 611 derives outSamplesL as follows:

outSamplesL[$x$/2*2][$y$/2*2]=outputTensor[0][$y$/2][$x$/2]

outSamplesL[$x$/2*2+1][$y$/2*2]=outputTensor[1][$y$/2][$x$/2]

outSamplesL[$x$/2*2][$y$/2*2+1]=outputTensor[2][$y$/2][$x$/2]

outSamplesL[$x$/2*2+1][$y$/2*2+1]=outputTensor[3][$y$/2][$x$/2]

Alternatively, the NN filter unit 611 may perform the following derivations:

outSamplesL[$cx$*2][$cy$*2]=outputTensor[0][$cy$][$cx$]

outSamplesL[$cx$*2+1][$cy$*2]=outputTensor[1][$cy$][$cx$]

outSamplesL[$cx$*2][$cy$*2+1]=outputTensor[2][$cy$][$cx$]

outSamplesL[$cx$*2+1][$cy$*2+1]=outputTensor[3][$cy$][$cx$]

At this time, in a case that the output image is in 4:2:0 format (ChromaFormatIdc of the output image is 1, SW=SH=2), the NN filter unit 611 derives outSamplesCb and outSamplesCr as follows:

outSamplesCb[$cx$][$cy$]=outputTensor[4][$cy$][$cx$]

outSamplesCr[$cx$][$cy$]=outputTensor[5][$cy$][$cx$]

At this time, in a case that the output image is in 4:2:2 format (ChromaFormatIdc of the output image is 2, SW=2, and SH=1), the NN filter unit 611 derives outSamplesCb and outSamplesCr as follows:

outSamplesCb[$cx$][$cy$/2*2]=outputTensor[4][$cy$][$cx$]

outSamplesCb[$cx$][$cy$/2*2+1]=outputTensor[4][$cy$][$cx$]

outSamplesCr[$cx$][$cy$/2*2]=outputTensor[5][$cy$][$cx$]

outSamplesCr[$cx$][$cy$/2*2+1]=outputTensor[5][$cy$][$cx$]

At this time, in a case that the output image is in 4:4:4 format (ChromaFormatIdc of the output image is 3, SW=SH=1), the NN filter unit 611 derives outSamplesCb and outSamplesCr as follows:

outSamplesCb[$cx$][$cy$/2*2][$cy$/2*2]=outputTensor[4][$cy$][$cx$]

outSamplesCb[$cx$][$cy$/2*2][$cy$/2*2+1]=outputTensor[4][$cy$][$cx$]

outSamplesCb[$cx$/2*2+1][$cy$/2*2]=outputTensor[4][$cy$][$cx$]

outSamplesCb[$cx$/2*2+1][$cy$/2*2+1]=outputTensor[4][$cy$][$cx$]

outSamplesCr[$cx$/2*2][$cy$/2*2]=outputTensor[5][$cy$][$cx$]

outSamplesCr[$cx$/2*2][$cy$/2*2+1]=outputTensor[5][$cy$][$cx$]

outSamplesCr[$cx$/2*2+1][$cy$/2*2]=outputTensor[5][$cy$][$cx$]

outSamplesCr[$cx$/2*2+1][$cy$/2*2+1]=outputTensor[5][$cy$][$cx$]

In a case that nnrpf_output_format_idc is 3, outSamplesCb and outSamplesCr may be derived as follows:
for (j=0; j<out$SH$; j++)
  for (i=0; i<out$SW$; i++)

outSamplesCb[$cx$/out$SW$*out$SW$+i$][$cy$/out$SH$*out$SH$+$j$]=outputTensor[4][$cy$][$cx$]

outSamplesCr[$cx$/out$SW$*out$SW$+i$][$cy$/out$SH$*out$SH$+$j$]=outputTensor[5][$cy$][$cx$]

In a case of YUV 4:2:0 format, cx=x/2 and cy=y/2. Thus, the NN filter unit 611 may derive outSamplesL as follows:

outSamplesL[$x$/2*2][$y$/2*2]=outputTensor[0][$y$/2][$x$/2]

outSamplesL[$x$/2*2+1][$y$/2*2]=outputTensor[1][$y$/2][$x$/2]

outSamplesL[$x$/2*2][$y$/2*2+1]=outputTensor[2][$y$/2][$x$/2]

outSamplesL[$x$/2*2+1][$y$/2*2+1]=outputTensor[3][$y$/2][$x$/2]

outSamplesCb[$x$/out$SW$][$y$/out$SH$]=outputTensor[4][$y$/2][$x$/2]

outSamplesCr[$x$/out$SW$][$y$/out$SH$]=outputTensor[5][$y$/2][$x$/2]

Note that the above-described processing may be performed according to numOutChannels, as described below.

Note that out$SW$ and out$SH$ may be set the same as in the color component sampling of the input data, that is:
outSW=SW; and
outSH=SH,
for processing.

CONCLUSION

An alternative configuration of the present application may decode coded data including an input tensor identification parameter indicating a mapping between a channel of an input tensor of a neural network model and a color component.

In an alternative configuration of the present application, a relational expression for deriving an input tensor from an input image may be defined according to the input tensor identification parameter and the chroma sampling of the input image.

In an alternative configuration of the present application, the input tensor identification parameter may indicate one of one channel, two channels, three channels, and six channels.

An alternative configuration of the present application may include means for deriving an input tensor from an input image according to the input tensor identification parameter.

An alternative configuration of the present application may decode coded data including an output tensor identification parameter indicating a mapping between a channel of an output tensor from a neural network model and a color component.

In an alternative configuration of the present application, a relational expression for deriving an input tensor from the output image may be defined according to the output tensor identification parameter and the chroma sampling of the output image.

In an alternative configuration of the present application, the output tensor identification parameter may indicate one of one channel, two channels, three channels, and six channels.

An alternative configuration of the present application may include means for deriving an output image from the output tensor according to the output tensor identification parameter.

As described above, the present SEI include information regarding the format of input data to the NN filter and the format of output data from the NN filter. This provides an effect in enabling easy selection of the method of appropriately transforming the decoded image into input data to the NN filter and the method of appropriately transforming the output data from the NN filter into an output image, without loading or analyzing a model.

Configuration for Deriving Input Tensor Identification Parameter and Output Tensor Parameter Note that the NN filter unit 601 may derive the input tensor identification parameter and the output tensor identification parameter from the topology of the NN model transmitted in the coded data or identified by the URI rather than decoding the parameters from coded data such as supplemental data.

The NN filter unit 601 derives nnrpf_input_format_idc according to the number of channels numInChannels in the input data inputTensor for the NN model as follows.

For numInChannels indicating one channel, nnrpf_input_format_idc=0
For numInChannels indicating two channels, nnrpf_input_format_idc=1
For numInChannels indicating three channels, nnrpf_input_format_idc=2
For numInChannels indicating six channels, nnrpf_input_format_idc=3

The NN filter unit 601 derives nnrpf_output_format_idc according to the number of channels numOutChannels in the output data outputTensor from the NN model as follows.

For numOutChannels indicating one channel, nnrpf_output_format_idc=0
For numOutChannels indicating two channels, nnrpf_output_format_idc=1
For numOutChannels indicating three channels, nnrpf_output_format_idc=2
For numOutChannels indicating six channels, nnrpf_output_ format_idc=3

According to the configuration described above, the NN filter unit 601 analyzes the number of dimensions in the input data to and the output data from the NN model transmitted in or indicated by the coded data. Then, in accordance with the analysis results (input tensor identification parameter and output tensor identification parameter), the NN filter unit 611 transforms the input image into an input tensor, and transforms the output tensor into an output image. This provides an effect in enabling identifying the relationship between the color components and the channels not indicated by the NN model itself to prepare NN input data, allowing an output image to be obtained from the NN output data. Note that the present SEI may include information of the neural network model complexity.

Configuration of Image Coding Apparatus

Figure 6:
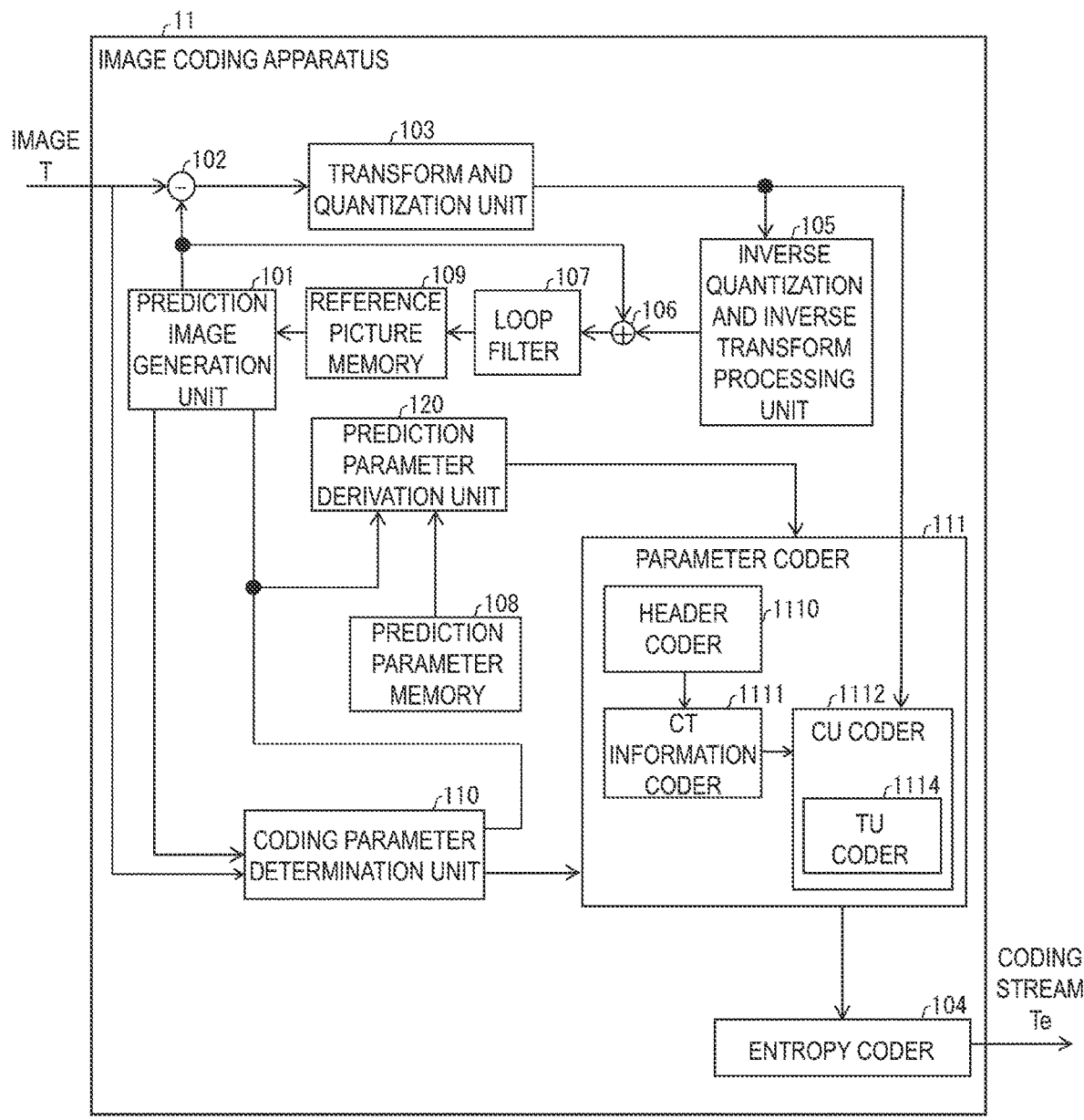
FIG. 6 is a block diagram illustrating a configuration of an image coding apparatus.

Next, a configuration of the image coding apparatus 11 according to the present embodiment will be described. FIG. 6 is a block diagram illustrating a configuration of the image coding apparatus 11 according to the present embodiment. The image coding apparatus 11 includes a prediction image generation unit 101, a subtraction unit 102, a transform and quantization unit 103, an inverse quantization and inverse transform processing unit 105, an addition unit 106, a loop filter 107, a prediction parameter memory (a prediction parameter storage unit, a frame memory) 108, a reference picture memory (a reference image storage unit, a frame memory) 109, a coding parameter determination unit 110, a parameter coder 111, a prediction parameter derivation unit 120, and an entropy coder 104.

The prediction image generation unit 101 generates a prediction image for each CU.

The subtraction unit 102 subtracts a pixel value of the prediction image of a block input from the prediction image generation unit 101 from a pixel value of the image T to generate a prediction error. The subtraction unit 102 outputs the prediction error to the transform and quantization unit 103.

The transform and quantization unit 103 performs a frequency transform on the prediction error input from the subtraction unit 102 to calculate a transform coefficient, and derives a quantization transform coefficient by quantization. The transform and quantization unit 103 outputs the quantization transform coefficient to the parameter coder 111 and the inverse quantization and inverse transform processing unit 105.

The inverse quantization and inverse transform processing unit 105 is the same as the inverse quantization and inverse transform processing unit 311 (FIG. 4) in the image decoding apparatus 31, and descriptions thereof are omitted. The calculated prediction error is output to the addition unit 106.

The parameter coder 111 includes a header coder 1110, a CT information coder 1111, and a CU coder 1112 (prediction mode coder). The CU coder 1112 further includes a TU coder 1114. General operation of each module will be described below.

The header coder 1110 performs coding processing of parameters such as header information, split information, prediction information, and quantization transform coefficients.

The CT information coder 1111 codes the split information and the like.

The CU coder 1112 codes the CU information, the prediction information, the split information, and the like.

In a case that a prediction error is included in the TU, the TU coder 1114 codes the QP update information and the quantization prediction error.

The CT information coder 1111 and the CU coder 1112 supply, to the parameter coder 111, syntax elements such as the inter prediction parameter, the intra prediction parameter, and the quantization transform coefficient.

The parameter coder 111 inputs the quantization transform coefficient and the coding parameters (split information and prediction parameters) to the entropy coder 104. The entropy coder 104 entropy-codes the quantization transform coefficient and the coding parameters to generate a coded data Te and outputs the coded data Te.

The prediction parameter derivation unit 120 derives an intra prediction parameter and an intra prediction parameter from the parameters input from the coding parameter determination unit 110. The intra prediction parameter and intra prediction parameter derived are output to the parameter coder 111.

The addition unit 106 adds together, for each pixel, a pixel value for the prediction block input from the prediction image generation unit 101 and a prediction error input from the inverse quantization and inverse transform processing unit 105, generating a decoded image. The addition unit 106 stores the generated decoded image in the reference picture memory 109.

The loop filter 107 applies a deblocking filter, an SAO, and an ALF to the decoded image generated by the addition unit 106. Note that the loop filter 107 need not necessarily include the above-described three types of filters, and may have a configuration of only the deblocking filter, for example.

The prediction parameter memory 108 stores the prediction parameters generated by the coding parameter determination unit 110 for each target picture and CU at a predetermined position.

The reference picture memory 109 stores the decoded image generated by the loop filter 107 for each target picture and CU at a predetermined position.

The coding parameter determination unit 110 selects one set among multiple sets of coding parameters. The coding parameters include the split information described above, a prediction parameter, or a parameter to be coded which is generated in relation to the split information or the prediction parameter. The prediction image generation unit 101 generates the prediction image by using these coding parameters.

The coding parameter determination unit 110 calculates, for each of the multiple sets, an RD cost value indicating the magnitude of an amount of information and a coding error. The RD cost value is, for example, the sum of a code amount and the value obtained by multiplying a coefficient $\lambda$, by a square error. The code amount is the amount of information in the coded data Te obtained by performing entropy coding on a quantization error and a coding parameter. The square error is the square sum of the prediction errors calculated in the subtraction unit 102. The coefficient $\lambda$, is a real number greater than a preset zero. The coding parameter determination unit 110 selects a set of coding parameters of which cost value calculated is a minimum value. The coding parameter determination unit 110 outputs the determined coding parameters to the parameter coder 111 and the prediction parameter derivation unit 120.

Note that a computer may be used to implement a part of the image coding apparatus 11 and the image decoding apparatus 31 in the above-described embodiments, for example, the entropy decoder 301, the parameter decoder 302, the loop filter 305, the prediction image generation unit 308, the inverse quantization and inverse transform processing unit 311, the addition unit 312, the prediction parameter derivation unit 320, the prediction image generation unit 101, the subtraction unit 102, the transform and quantization unit 103, the entropy coder 104, the inverse quantization and inverse transform processing unit 105, the loop filter 107, the coding parameter determination unit 110, a parameter coder 111, and the prediction parameter derivation unit 120. In that case, this configuration may be realized by recording a program for realizing such control functions on a computer-readable recording medium and causing a computer system to read and perform the program recorded on the recording medium. Note that the "computer system" mentioned here refers to a computer system built into either the image coding apparatus 11 or the image decoding apparatus 31 and is assumed to include an OS and hardware components such as a peripheral apparatus. A "computer-readable recording medium" refers to a portable medium such as a flexible disk, a magneto-optical disk, a ROM, and a CD-ROM, and a storage device such as a hard disk built into the computer system. Moreover, the "computer-readable recording medium" may include a medium that dynamically stores a program for a short period of time, such as a communication line in a case that the program is transmitted over a network such as the Internet or over a communication line such as a telephone line, and may also include a medium that stores the program for a fixed period of time, such as a volatile memory included in the computer system functioning as a server or a client in such a case. The above-described program may be one for realizing some of the above-described functions, and also may be one capable of realizing the above-described functions in combination with a program already recorded in a computer system.

Part or all of the image coding apparatus 11 and the image decoding apparatus 31 in the embodiments described above may be realized as an integrated circuit such as a Large Scale Integration (LSI). Each function block of the image coding apparatus 11 and the image decoding apparatus 31 may be individually realized as processors, or part or all may be integrated into processors. The circuit integration technique is not limited to LSI, and the integrated circuits for the functional blocks may be realized as dedicated circuits or a multi-purpose processor. In a case that, with advances in semiconductor technology, a circuit integration technology with which an LSI is replaced appears, an integrated circuit based on the technology may be used.

The embodiment of the present disclosure has been described in detail above referring to the drawings, but the specific configuration is not limited to the above embodiment and various amendments can be made to a design that fall within the scope that does not depart from the gist of the present disclosure.

NNR

The Neural Network Coding and Representation (NNR) is an international standard for efficiently compressing a neural network (NN) model. By compressing a trained NN model, the efficiency can be improved with which the NN model is saved or transmitted.

Coding and decoding processing for NNR will be described below in brief.

Figure 13:
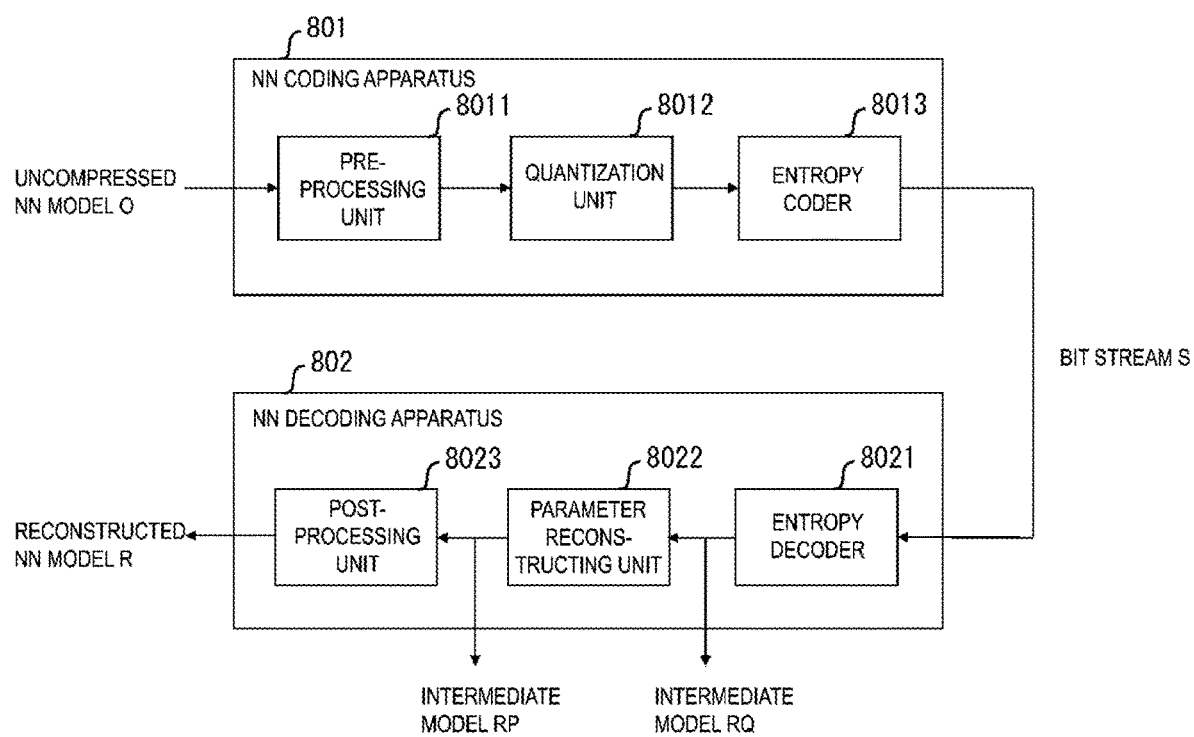
FIG. 13 is a diagram illustrating a coding apparatus and a decoding apparatus for NNR.

FIG. 13 illustrates a coding apparatus and a decoding apparatus for NNR.

The NN coding apparatus 801 includes a pre-processing unit 8011, a quantization unit 8012, and an entropy coder 8013. The NN coding apparatus 801 receives an NN model O that is uncompressed, and quantizes the NN model O in the quantization unit 8012 to obtain a quantization model Q. Before the quantization, the NN coding apparatus 801 may repeatedly apply, in the pre-processing unit 8011, a parameter reduction technique such as pruning or sparsity learning. Subsequently, the entropy coder 8013 applies entropy coding to the quantization model Q, and obtains a bit stream S for saving or transmitting the NN model.

The NN decoding apparatus 802 includes an entropy decoder 8021, a parameter reconstructing unit 8022, a post-processing unit 8023. The NN decoding apparatus 802 receives the bit stream S transmitted, and performs entropy decoding of S in the entropy decoder 8021, and derive an intermediate model RQ. In a case that an operating environment for the NN model supports inference using quantization representation used in the RQ, the NN decoding apparatus 802 may output and use the RQ for inference. Otherwise, the parameter reconstructing unit 8022 reconstructs parameters of the RQ in the original representation, and derives the intermediate model RP. In a case that sparse tensor representation can be processed in the operating environment of the NN model, then the RP may be output and used for inference. Otherwise, a reconstructed NN model R is obtained and output that includes no tensor nor structural representation different from that for the NN model O.

The NNR standard includes decoding approaches for numerical representations of specific NN parameters, such as integers, floating points, etc.

A decoding approach NNR_PT_INT decodes a model including a parameter of an integer value. A decoding approach NNR_PT_FLOAT extends the NNR_PT_INT and adds a quantization step size delta. The quantization step size delta is multiplied by the integer value to generate a scaled integer. delta is derived from an integral quantization parameter qp and the granularity parameter qp_density of delta as follows.

$$mul=2^{\wedge}(qp\_density)+(qp\&(2^{\wedge}(qp\_density)-1))$$

$$delta=mul*2^{\wedge}((qp>>qp\_density)-qp\_density)$$

Format of Trained NN.

The representation of a trained NN includes two elements: topology representation such as layer sizes and connections between layers, and parameter representation such as weights and biases.

The topology representation is covered by native formats such as Tensorflow and PyTorch, but for improved interoperability, exchange formats are available such as Open Neural Network Exchange Format (ONNX), and Neural Network Exchange Format (NNEF).

In the NNR standard, topology information nnr_topology_unit_payload is transmitted as part of an NNR bit stream including a compressed parameter tensor. This achieves interoperability not only with the exchange format but also with topology information represented in the native format.

Post-Filter Purpose SEI

The post-filter purpose SEI indicates the purpose of post-filtering processing and describes input/output information according to the purpose of the post-filtering processing. FIG. 11 illustrates an example of a syntax of the post-filter purpose SEI.

First, as an input of the post-filter purpose SEI, InputChromaFormatIdc (ChromaFormatIdc) of an input image is defined. This value is set equal to the value of sps_chroma_format_idc of coded data.

The value of pfp_id indicates the identification number of post-filtering processing indicated by any other mechanism. In the present embodiment, the post-filtering processing is associated with the NN filter SEI.

In the current hierarchy, this SEI message is applied to the current decoded image and all subsequent decoded images in order of output until a Coded Layer Video Sequence (CLVS) is initiated or the bit stream is terminated.

- pfp_id includes an identification number used to identify post-filtering processing. The identification number is assumed to take a value ranging from 0 to 2^20−1. The values from 2^20 to 2^21−1 are reserved for future.
- pfp_purpose indicates the purpose of post-filtering processing identified by pfp_id. The value of pfp_purpose ranges from 0 to 2^32−2. Otherwise, the value of pfp_purpose is reserved for future indication. Note that the decoder for supplemental enhancement information ignores the post_filter_purpose SEI message including the reservation value of the pfp_purpose.

A pfp_purpose value of 0 indicates improved visual quality. That is, the value means that post-filtering processing is applied that is associated with image reconstruction processing involving no image resolution transformation.

In a case that a pfp_purpose value is 1, the width or height of a trimmed decoded output image is required. That is, the value means that post-filtering processing is applied that involves transformation of image resolution.

In a case that a pfp_purpose value is 1, the syntax elements pfp_pic_width_in_luma_samples and pfp_pic_height_in_luma_samples are present.

- pfp_pic_width_in_luma_samples indicates the width of a luma pixel array of an image corresponding to the result of the application of a post-processing filter identified by pfp_id to a trimmed decoded output image.
- pfp_pic_height_in_luma_samples indicates the height of the luma pixel array of the image corresponding to the result of the application of the post-processing filter identified by pfp_id to the trimmed decoded output image.

In the examples of NPL 1 and NPL 2, the information of resolution transformation and inverse transform associated with chroma format transformation cannot be described well. The present embodiment solves the above-described problem by clarifying the input/output information.

In a case that a pfp_purpose value is 2, the syntax elements indicating the color component to which the post-filtering processing is applied and the information of the output chroma format are present. In other words, the value means that the post-filtering processing related to the chroma format transformation is applied.

In a case that a pfp_purpose value is 2, the syntax elements pfp_component_idc and pfp_output_diff_chroma_format_idc are present.

- pfp_component_idc indicates the color component to which the post-filtering processing is applied.

A pfp_component_idc value of 0 indicates that the post-filtering processing is applied to only the luma component.

A pfp_component_idc value of 1 indicates that the post-filtering processing is applied to the two chroma components.

A pfp_component_idc value of 2 indicates that the post-filtering processing is applied to all of the three color components.

- pfp_output_diff_chroma_format_idc indicates the difference value between the identification value of the chroma format output by the post-filtering processing and the identification value of the input chroma format. Note that the value of pfp_output_diff_chroma_format_idc needs to range from 0 to 2. A variable OutputChromaFormatIdc is derived as described below, the variable corresponding to the identification value of the chroma format output by the post-filtering processing.

$$OutputChromaFormatIdc=InputChromaFormatIdc+pfp\_output\_diff\_chroma\_format\_idc$$

Here, InputChromaFormatIdc is the value of sps_chroma_format_idc described in the SPS of the coded data, the value corresponding to the identification value of the chroma format of the decoded image. A value of 0 indicates monochrome (4:0:0), a value of 1 indicates 4:2:0, a value of 2 indicates 4:2:2, and a value of 3 indicates 4:4:4. For a variable OutputChromaFormatIdc corresponding to the identification value of the chroma format output by the post-filtering processing, a value of 0 indicates monochrome (4:0:0), a value of 1 indicates 4:2:0, a value of 2 indicates 4:2:2, and a value of 3 indicates 4:4:4, as in the case with InputChromaFormatIdc.

The NN filter unit 611 derives a variable indicating the color sub-sample of the output image as follows.

$$\text{outSubWidthC=out}SW=1, \text{outSubHeightC=out}SH=1$$
$$(\text{OutputChromaFormatIdc}==0)$$

$$\text{outSubWidthC=out}SW=2, \text{outSubHeightC=out}SH=2$$
$$(\text{OutputChromaFormatIdc}==1)$$

$$\text{outSubWidthC=out}SW=2, \text{outSubHeightC=out}SH=1$$
$$(\text{OutputChromaFormatIdc}==2)$$

$$\text{outSubWidthC=out}SW=1, \text{outSubHeightC=out}SH=1$$
$$(\text{OutputChromaFormatIdc}==3)$$

As described above, the input components and output format of the post-filtering processing of the chroma format transformation are defined, so that the input/output data of the post-filtering processing of the chroma format transformation can be clarified.

Note that luma and chroma are distinguished from each other for pfp_component_idc indicating the color component to which the above-described post-filtering processing is applied but that the number of components may be simply indicated. Specifically, the following semantics may be used.

A pfp_component_idc value of 0 indicates the application of the post-filtering processing of one component.

A pfp_component_idc value of 1 indicates the application of the post-filtering processing to two components.

A pfp_component_idc value of 2 indicates the application of the post-filtering processing to all of the three components.

The NN filter unit 611 may switch the NN model according to pfp_component_idc.

In a case of pfp_component_idc==0: The NN filter unit 611 selects an NN model, which derives a three-dimensional tensor of one channel from a three-dimensional tensor of one channel, and performs filtering processing.

In a case of pfp_component_idc==1: The NN filter unit 611 selects an NN model, which derives a three-dimensional tensor of two channels from a three-dimensional tensor of two channels, and performs filtering processing.

In a case of pfp_component_idc==2: The NN filter unit 611 selects an NN model, which derives a three-dimensional tensor of three channels from a three-dimensional tensor of three channels, and performs filtering processing.

The appropriate NN model is selected depending on the color components to be applied, providing an effect in reducing the amount of processing.

The NN filter unit 611 may derive nnrpf_input_format_idc according to pfp_component_idc as described below; for example, one-channel NN model for one component, two-channel NN model for two components, and three-channel NN model for three components.

nnrpf_input_format_idc=0 (pfp_component_idc==0)
nnrpf_input_format_idc=1 (pfp_component_idc==1)
nnrpf_input_format_idc=2 (pfp_component_idc==2)

In other words, nnrpf_input_format_idc=pfp_component_idc

As another example, the NN filter unit 611 may derive nnrpf_input_format_idc according to pfp_component_idc as described below; for example, one-channel NN model for one component, two-channel NN model for two components, and six-channel NN model for three components.

nnrpf_input_format_idc=0 (pfp_component_idc==0)
nnrpf_input_format_idc=1 (pfp_component_idc==1)
nnrpf_input_format_idc=3 (pfp_component_idc==2)

That is, nnrpf_input_format_idc=pfp_component_idc<2?pfp_component_idc:3

This provides an effect in allowing the processing to be performed by selecting the tensor format of the appropriate NN model according to the color components to be applied.

The NN filter unit 611 may derive inputTensor depending directly on pfp_component_idc as described above.

By switching the value of the input image ComponentSamples and the value of the NN output data outputTensor according to pfp_component_idc, the NN filter unit 611 may derive the output image by the following processing.

For pfp_component_idc==0, $$\text{outSamplesL}[x][y]=\text{outputTensor}[0][y][x]$$

$$\text{outSamplesCb}[x*2/\text{out}SW][y*2/\text{out}SH]=\text{ComponentSamples}[1][x*2/SW][y*2/SH]$$

$$\text{outSamplesCr}[x*2/\text{out}SW][y*2/\text{out}SH]=\text{ComponentSamples}[2][x*2/SW][y*2/SH]$$

For pfp_component_idc==1, $$\text{outSamplesL}[x][y]=\text{ComponentSamples}[0][x][y]$$

$$\text{outSamplesCb}[x*2/\text{out}SW][y*2/\text{out}SH]=\text{outputTensor}[0][x*2/SW][y*2/SH]$$

$$\text{outSamplesCr}[x*2/\text{out}SW][y*2/\text{out}SH]=\text{outputTensor}[1][x*2/SW][y*2/SH]$$

For pfp_component_idc==2, $$\text{outSamplesL}[x][y]=\text{outputTensor}[0][x][y]$$

$$\text{outSamplesCb}[x*2/\text{out}SW][y*2/\text{out}SH]=\text{outputTensor}[1][x*2/SW][y*2/SH]$$

$$\text{outSamplesCr}[x*2/\text{out}SW][y*2/\text{out}SH]=\text{outputTensor}[2][x*2/SW][y*2/SH]$$

In addition, in the example described above, the identification value of the chroma format output by the post-filtering processing is indicated by the difference value of the identification value of the input chroma format, but may be described directly by the syntax element.

In the present embodiment, the post-filter purpose SEI is defined independently of the NN filter SEI to define the input/output of the post-filtering processing. However, a similar syntax may be defined for the NN filter SEI, allowing the problem to be similarly solved.

The present embodiment, with reference to FIG. 1, provides a video decoding apparatus including an image decoding apparatus configured to decode coded data obtained by coding an image, a resolution inverse transform apparatus configured to transform resolution of the image decoded by the image decoding apparatus, and an inverse transform information decoding apparatus configured to decode color component information input to the resolution inverse transform apparatus and chroma format information output from the resolution inverse transform apparatus.

The present embodiment also provides a video coding apparatus including an image coding apparatus configured to code an image, and an inverse transform information coding apparatus configured to code color component information input to a resolution inverse transform apparatus configured to transform a resolution of the coded image, and chroma format information output from the resolution inverse transform apparatus.

APPLICATION EXAMPLES

The above-mentioned video coding apparatus 10 and the video decoding apparatus 30 can be utilized being installed to various apparatuses performing transmission, reception, recording, and reconstruction of videos. Note that, the video may be a natural video imaged by camera or the like, or may be an artificial video (including CG and GUI) generated by computer or the like.

Realization by Hardware and Realization by Software

Each block of the above-mentioned video decoding apparatus 30 and the video coding apparatus 10 may be realized as a hardware by a logical circuit formed on an integrated circuit (IC chip), or may be realized as a software using a Central Processing Unit (CPU).

While preferred embodiments of the present invention have been described above, it is to be understood that variations and modifications will be apparent to those skilled in the art without departing from the scope and spirit of the present invention. The scope of the present invention, therefore, is to be determined solely by the following claims.

INDUSTRIAL APPLICABILITY

The embodiment of the present disclosure can be preferably applied to a video decoding apparatus that decodes coded data in which image data is coded, and a video coding apparatus that generates coded data in which image data is coded. The embodiment of the present disclosure can be preferably applied to a data structure of coded data generated by the video coding apparatus and referred to by the video decoding apparatus.

What is claimed is:

1. An image decoding apparatus for decoding information specifying a neural network, the image decoding apparatus comprising:
   header decoding circuitry that decodes an input tensor identification parameter specifying a process for deriving an input tensor for a post filter of the neural network,
   wherein
   the input tensor identification parameter is a parameter related to a color component channel.

2. The image decoding apparatus of claim 1, wherein a relational expression for deriving the input tensor is defined by the input tensor identification parameter and a chroma sampling of an input image.

3. The image decoding apparatus of claim 1, wherein the header decoding circuitry decodes an output tensor identification parameter specifying a number of color component channels of an output tensor of the post filter of the neural network.

4. The image decoding apparatus of claim 3, wherein a relational expression for deriving an output image by using the output tensor is defined by the output tensor identification parameter and a chroma sampling of the output image.

5. The image decoding apparatus of claim 1, wherein the header decoding circuitry decodes neural network model complexity information.

6. The image decoding apparatus of claim 5, wherein the neural network model complexity information includes a first syntax element indicating a number of neural network parameters for the post filter.

7. The image decoding apparatus of claim 5, wherein the neural network model complexity information includes a second syntax element indicating a parameter type of the neural network.

8. The image decoding apparatus of claim 5, wherein the neural network model complexity information includes a third syntax element indicating a bit size of the neural network.

9. The image decoding apparatus of claim 6, wherein the header decoding circuitry derives a maximum number of parameters by using the first syntax element.

10. The image decoding apparatus of claim 5, wherein the neural network model complexity information includes a fourth syntax element specifying a number of operations for the post filter.

11. An image encoding apparatus for encoding information specifying a neural network, the image encoding apparatus comprising:
    header encoding circuitry that encodes an input tensor identification parameter specifying a process for deriving an input tensor for a post filter of the neural network,
    wherein
    the input tensor identification parameter is a parameter related to a color component channel.

12. An image decoding method for decoding information specifying a neural network, the image decoding method including:
    decoding an input tensor identification parameter specifying a process for deriving an input tensor for a post filter of the neural network,
    wherein
    the input tensor identification parameter is a parameter related to a color component channel.

* * * * *